(12) United States Patent
Haga et al.

(10) Patent No.: US 7,961,387 B2
(45) Date of Patent: Jun. 14, 2011

(54) OBSERVATION DEVICE AND BINOCULARS

(75) Inventors: Shunichi Haga, Kodaina (JP); Kenji Yamada, Yachiyo (JP)

(73) Assignees: Nikon Vision Co. Ltd., Tokyo (JP); Nikon Corporation, Tokyo (JP)

( * ) Notice: Subject to any disclaimer, the term of this patent is extended or adjusted under 35 U.S.C. 154(b) by 836 days.

(21) Appl. No.: 10/594,435

(22) PCT Filed: Mar. 1, 2005

(86) PCT No.: PCT/JP2005/003402
§ 371 (c)(1),
(2), (4) Date: Dec. 29, 2007

(87) PCT Pub. No.: WO2005/093486
PCT Pub. Date: Oct. 6, 2005

(65) Prior Publication Data
US 2008/0239479 A1    Oct. 2, 2008

(30) Foreign Application Priority Data

Mar. 26, 2004  (JP) .................. 2004-092182
Jul. 14, 2004   (JP) .................. 2004-207388
Oct. 18, 2004   (JP) .................. 2004-303218

(51) Int. Cl.
*G02B 23/00* (2006.01)
(52) U.S. Cl. .................. 359/400; 359/407
(58) Field of Classification Search .............. 359/399, 359/404–418, 400
See application file for complete search history.

(56) References Cited

U.S. PATENT DOCUMENTS

| | | | |
|---|---|---|---|
| 6,549,337 B2 | 4/2003 | Iizuka et al. | |
| 2002/0034004 A1* | 3/2002 | Khoshnevis et al. | 359/407 |
| 2003/0197931 A1 | 10/2003 | Yano | 359/431 |
| 2004/0125443 A1* | 7/2004 | Nakajima | 359/407 |

FOREIGN PATENT DOCUMENTS

| | | |
|---|---|---|
| JP | 7-49456 | 2/1995 |
| JP | 07-049456 A | 2/1995 |
| JP | 9-304705 | 11/1997 |
| JP | 09-304705 A | 11/1997 |
| JP | 2000-147372 | 5/2000 |
| JP | 2000-147372 A | 5/2000 |

(Continued)

OTHER PUBLICATIONS

Office Action issued in related Japanese Patent Appln. No. 2006-511410 on Aug. 3, 2010.

*Primary Examiner* — Alessandro Amari
(74) *Attorney, Agent, or Firm* — Miles & Stockbridge P.C.

(57) ABSTRACT

An observation device has an ocular lens and an objective lens and is adapted to observe through the ocular lens an intermediate image of an object formed by the objective lens. The observation device further includes a display section provided either on a light path connecting the ocular lens and the objective lens or on a light path branched off from the light path and displaying an image, and a light path switching section provided on the light path connecting the ocular lens and the objective lens and switching the light to be guided from the ocular lens to the objective lens and the image displayed on the display section to be guided to the ocular lens or the objective lens, thereby providing a small-sized observation device and binoculars having a display function.

16 Claims, 16 Drawing Sheets

FOREIGN PATENT DOCUMENTS

| | | |
|---|---|---|
| JP | 3070429 | 5/2000 |
| JP | 2001-343593 | 12/2001 |
| JP | 2001-343593 A | 12/2001 |
| JP | 2002-341254 | 11/2002 |
| JP | 2002-341254 A | 11/2002 |
| JP | 2002-341256 | 11/2002 |
| JP | 2002-341256 A | 11/2002 |
| JP | 2003-315686 | 11/2003 |

* cited by examiner

20 OBSERVATION DEVICE

OBSERVATION DEVICE AND BINOCULARS

TECHNICAL FIELD

The present invention relates to an observation device and binoculars having a display function.

BACKGROUND ART

There has been a conventionally known observation device such as a telescope that observes an intermediate image of an object formed by an objective lens through an ocular lens (for example, refer to Patent Document 1). In addition, there has been a known small-sized display device using liquid crystal techniques or the like.

Patent Document 1: Japanese Patent No. 3070429

DISCLOSURE OF THE INVENTION

Problem to be Solved by the Invention

In mounting the aforementioned small-sized display device on the aforementioned observation device to display information, there is a problem of upsizing the device. An observation device such as a telescope when incorporating the display device may desirably be small in size in view of portability since it is used outdoors frequently.

An object of the present invention is to provide a small-sized observation device and binoculars having a display function.

Means for Solving the Problem

An observation device according to the present invention is provided with an ocular lens and an objective lens and is adapted to observe through the ocular lens an intermediate image of an object formed by the objective lens. The observation device further includes a display section that is provided either on a light path connecting the ocular lens and the objective lens or on a light path branched off from the light path and displays an image; and a light path switching section that is provided on the light path connecting the ocular lens and the objective lens and switches light guided from the ocular lens to the objective lens and the image displayed on the display section to be guided to the ocular lens or the objective lens.

Another observation device according to the present invention is provided with an ocular lens and an objective lens and is adapted to observe through the ocular lens an intermediate image of an object formed by the objective lens. The observation device further includes a display section that is provided either on a light path connecting the ocular lens and the objective lens or on a light path branched off from the light path and displays an image; and a light path dividing section that is provided on the light path connecting the ocular lens and the objective lens, and guides light from the ocular lens to the objective lens and guides the image displayed on the display section to the ocular lens or the objective lens.

The light path switching section is preferably provided on the light path connecting the ocular lens and the objective lens at a position between the objective lens and a position where the intermediate image of the object is formed, and switches a light flux guided between the objective lens and the ocular lens and a light flux guided between the display section and the objective lens.

The light path dividing section is preferably provided on the light path connecting the ocular lens and the objective lens at a position between the objective lens and a position where the intermediate image of the object is formed, and guides a light flux between the objective lens and the ocular lens and guides the light flux between the display section and the objective lens.

The light path switching section is preferably provided on the light path connecting the ocular lens and the objective lens at a position between the ocular lens and a position where the intermediate image of the object is formed, and switches a light flux guided between the objective lens and the ocular lens and a light flux guided between the display section and the ocular lens.

The light path dividing section is preferably provided on the light path connecting the ocular lens and the objective lens at a position between the ocular lens and a position where the intermediate image of the object is formed, and guides a light flux between the objective lens and the ocular lens and guides the light flux between the display section and the ocular lens.

An erecting optical system is preferably provided on the light path connecting the ocular lens and the objective lens.

The erecting optical system preferably includes a prism.

The light path switching section or the light path dividing section is preferably provided between the prism and the objective lens.

Binoculars according to the present invention have two observation devices described above, and include the ocular lens, the objective lens, and the light path switching sections or the light path dividing sections in a right portion and a left portion, respectively.

Preferably, the binoculars further includes a dividing optical system that divides the image displayed on the display section and guides divided images to the objective lenses or the ocular lenses of the right and left portions, respectively.

The observation device preferably includes a display lens between one of the light path switching section and the light path dividing section and the display section.

The display section preferably displays an image for relieving eye fatigue. The image includes a picture which is specific in at least one of shape, brightness and color. The observation device further includes an image changing section changing at least one of a position and a feature of the picture in the image displayed on the display section.

A part or a whole of the objective lens is preferably movable in a direction along the light path connecting the ocular lens and the objective lens.

The display section preferably displays an image for relieving eye fatigue. The observation device further includes a position-changing section that is provided on a light path connecting the objective lens and the display section and changes a position of an intermediate image observed by an observer from the objective lens side in at least one of an optical axis direction and a convergent direction of eyes of the observer, and a controlling section that controls the display section, one of the light path switching section and the light path dividing section, and the position-changing section.

The display section preferably displays an image for relieving eye fatigue. The observation device further includes a position-changing section that is provided on a light path connecting the objective lens and the display section and changes a position of an intermediate image observed by an observer from the objective lens side in at least one of an optical axis direction and convergent direction of the eyes of the observer; a setting section that sets one of first, second, and third modes according to operation of the observer, the first mode being a mode in which a light flux is guided between the objective lens and the ocular lens by the light path switching section, the second mode being a mode in which the position of the intermediate image is changed in at least one of an optical axis direction and a convergent direction of the eyes of the observer by the position-changing section while the light flux is guided between the objective lens and the ocular lens by the light path switching section, and a third mode being a mode in which the position of the intermediate image is changed in at least one of an optical axis direction and a convergent direction of the eyes of the observer by the position-changing section while the light flux is guided between the display section and the objective lens by the light path switching section; and a controlling section that controls the light path switching section and the position-changing section according to the mode set by the setting section.

Preferably, the observation device further includes a dual-purpose lens that is provided on the light path connecting the ocular lens and the objective lens and is movable in a direction along the light path. The position-changing section preferably includes the dual-purpose lens, and the controlling section moves a position of the dual-purpose lens to thereby make focal adjustment of the observation device and change the position of the intermediate image observed by the observer from the objective lens side in the optical axis direction of the eyes of the observer.

When changing the position of the intermediate image observed by the observer from the objective lens side, the controlling section preferably moves the dual-purpose lens in a wider range than when making the focal adjustment.

Preferably, the observation device further includes a moving section that moves the display section in the convergent direction of the eyes of the observer.

Preferably, the observation device further includes a detecting section that detects a position of the dual-purpose lens, a memory section that stores a position of the dual-purpose lens detected by the detecting section when making the focal adjustment and when changing the position of the intermediate image, and a receiving section that receives an instruction to read the position of the dual-purpose lens stored in the memory section, in which the controlling section, when receiving the instruction from the receiving section, reads the position of the dual-purpose lens from the memory section and moves the dual-purpose lens to the read position.

An eye pad member is preferably provided near the objective lens.

The eye pad member preferably has a shape to give protection from flare.

A part or a whole of the ocular lens is preferably movable in a direction along the light path connecting the ocular lens and the objective lens.

The display section preferably displays an image for relieving eye fatigue. Preferably, the observation device further includes a position-changing section that is provided on a light path connecting the ocular lens and the display section and changes a position of an intermediate image observed by an observer from the ocular lens side in at least one of an optical axis direction and a convergent direction of the eyes of the observer, and a controlling section that controls the display section, one of the light path switching section and the light path dividing section and the position-changing section.

The display section preferably displays an image for relieving eye fatigue. Preferably, the observation device further includes a position-changing section that is provided on a light path connecting the ocular lens and the display section and changes a position of an intermediate image observed by an observer from the ocular lens side in at least one of an optical axis direction and a convergent direction of the eyes of the observer; a setting section that sets one of first, second, and third modes according to operation of the observer, a first mode being a mode in which a light flux is guided between the objective lens and the ocular lens by the light path switching section, a second mode being a mode in which the position of the intermediate image is changed in at least one of an optical axis direction and a convergent direction of the eyes of the observer by the position-changing section while the light flux is guided between the objective lens and the ocular lens by the light path switching section, and a third mode being a mode in which the position of the intermediate image is changed in at least one of an optical axis direction and a convergent direction of the eyes of the observer by the position-changing section while the light flux is guided between the display section and the ocular lens by the light path switching section; and a controlling section that controls the light path switching section and the position-changing section according to the mode set by the setting section.

Preferably, the observation device further includes a dual-purpose lens that is provided on the light path connecting the ocular lens and the objective lens and is movable in a direction along the light path. The position-changing section includes the dual-purpose lens, and the controlling section moves a position of the dual-purpose lens to thereby make focal adjustment of the observation device and change the position of the intermediate image observed by the observer from the objective lens side in the optical axis direction of the eyes of the observer.

When changing the position of the intermediate image observed by the observer from the ocular lens side, the controlling section preferably moves the dual-purpose lens in a wider range than when making the focal adjustment.

Preferably, the observation device further includes a moving section that moves the display section in the convergent direction of the eyes of the observer.

Preferably, the observation device includes a detecting section that detects a position of the dual-purpose lens, a memory section that stores the position of the dual-purpose lens detected by the detecting section when making the focal adjustment and when changing the position of the intermediate image, and a receiving section that receives an instruction to read the position of the dual-purpose lens stored in the memory section, in which the controlling section, when receiving the order from the receiving section, reads the position of the dual-purpose lens from the memory section and moves the dual-purpose lens to the read position.

EFFECT OF THE INVENTION

According to the present invention, there can be provided a small-sized observation device and binoculars having a display function.

BRIEF DESCRIPTION OF THE DRAWINGS

The nature, principle, and utility of the invention will become more apparent from the following detailed description when read in conjunction with the accompanying drawings in which like parts are designated by identical reference numbers, and in which.

BEST MODES FOR CARRYING OUT THE INVENTION

In the following, the embodiments according to the present invention are explained. Firstly, a description is made on embodiments where observation is made either from the ocular lens or the objective lens according to an intended purpose, and then on embodiments where observation is always made from the ocular lens. It is noted that in the first embodiment to the seventh embodiment observation is made either from the ocular lens or the objective lens according to an intended purpose and in the eighth and subsequent embodiments observation is always made from the ocular lens.

Figure 1:
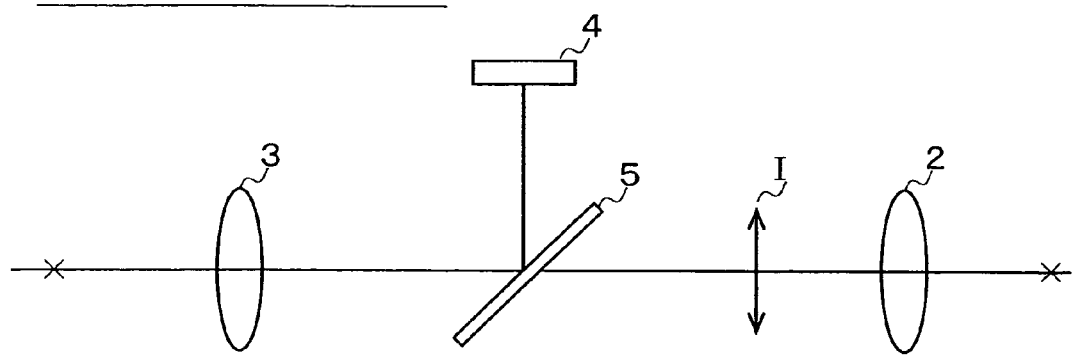
FIG. 1 is an explanatory view of the fundamental principle of the observation device according to the present invention.

First, a principle of an observation device according to the present invention is explained by referring to an explanatory view shown in FIG. 1. An observation device 1 according to the present invention includes, as shown in FIG. 1, an ocular lens 2, an objective lens 3, a display section 4 which is provided on a light path branched off from a light path connecting the ocular lens 2 and the objective lens 3, and a light path switching section 5 which is provided on the light path connecting the ocular lens 2 and the objective lens 3 and between the objective lens 3 and a position where an intermediate image I of an object is formed. Incidentally, the display section 4 is provided at a position almost conjugated with a position where the intermediate image I of the object is formed.

The light path switching section 5 is an optical member (for example a total internal reflection mirror) that switches a light flux guided between the objective lens 3 and the ocular lens 2 and a light flux guided between the display section 4 and the objective lens 3, and is driven by a driving section which is not shown in the drawing.

When the light flux is guided between the ocular lens 2 and the objective lens 3 by the light path switching section 5, an observer can observe the intermediate image I of an object formed by the objective lens 3 through the ocular lens 2. On the other hand, the light flux is guided between the display section 4 and the objective lens 3 by the light path switching section 5, an observer can observe an image displayed on the display section 4 through the objective lens 3.

Moreover there may be employed a construction where the light path switching section 5 is replaced by a light path dividing section. Namely, the observation 1 may include the light path dividing section composed of an optical member (for example a half mirror) that guides a light flux between the objective lens 3 and the ocular lens 2 and also guides the light flux between the display section 4 and the objective lens 3 instead of the light path switching section 5.

An observer can observe, when observing from the ocular lens 2 side, the intermediate image I of an object by utilizing the light flux guided between the objective lens and the ocular lens, and can observe, when observing from the objective lens 3 side, the display section 4 by utilizing the light flux guided between the display section 4 and the objective lens 3.

Embodiments on the basis of the fundamental principle explained above are explained with reference to the drawings.

First Embodiment

Figure 2:
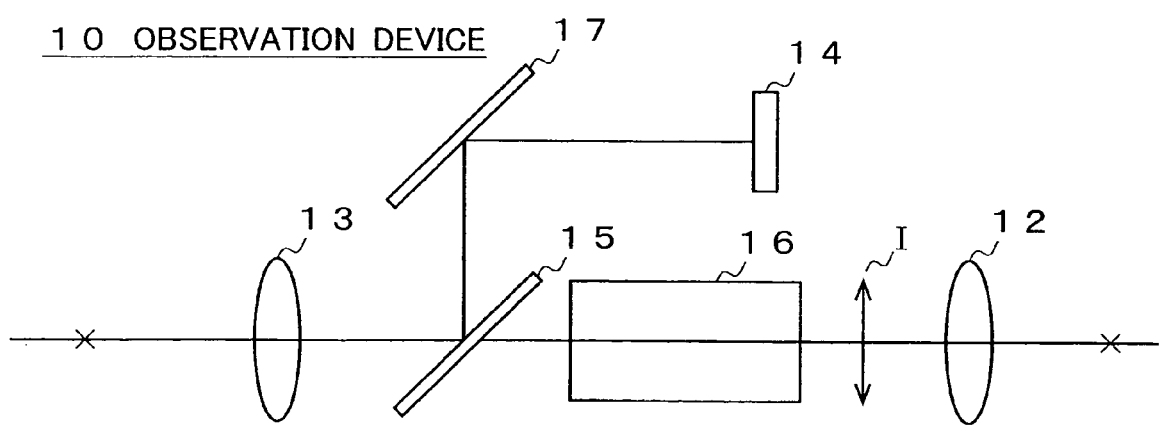
FIG. 2 is a view showing a construction of an observation device 10 according to a first embodiment.

An observation device 10 according to a first embodiment is, as shown in FIG. 2, includes: an ocular lens 12; an objective lens 13; a display section 14 that is provided on a light path branched off from the light path connecting the ocular lens 12 and the objective lens 13; a light path switching section 15 that is provided on the light path connecting the ocular lens 12 and the objective lens 13 and at a position between the objective lens 13 and a position where an intermediate image I of an object is formed; an erecting optical system 16 that is provided on the light path connecting the ocular lens 12 and the objective lens 13, and a mirror 17.

Figure 3:
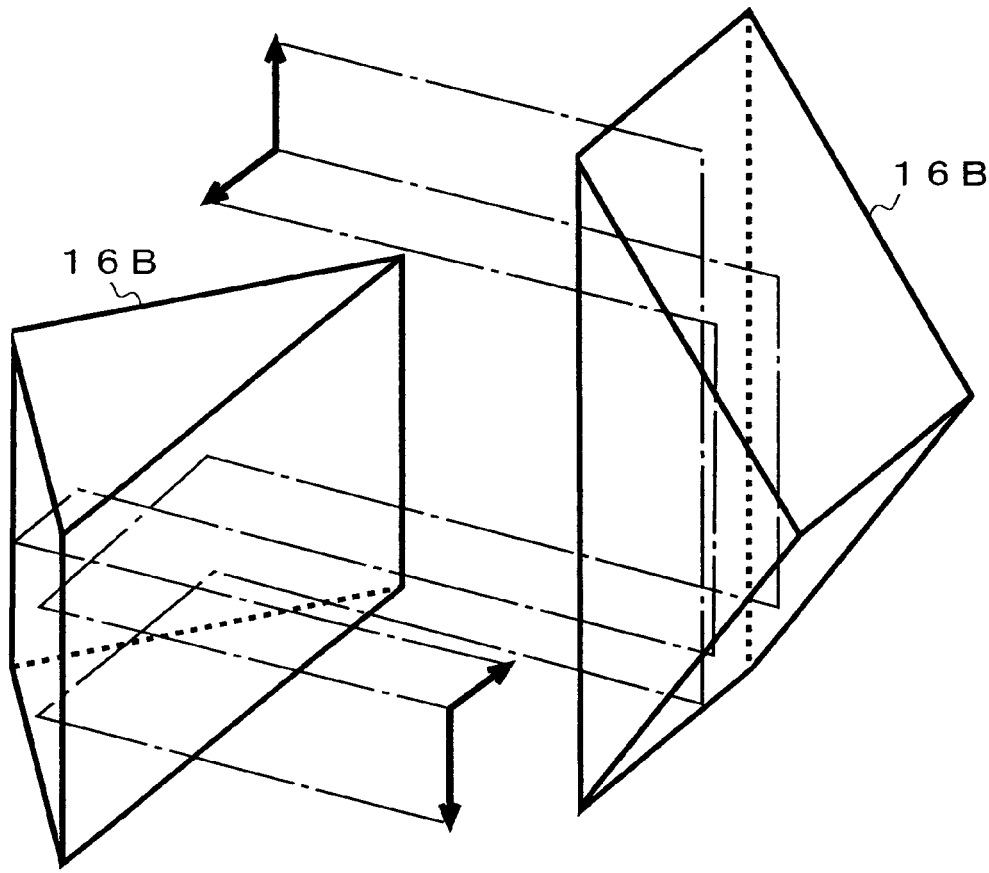
FIG. 3 is a view showing a porro type prism.

The objective lens 13 is movable in the direction along the light path connecting the ocular lens 12 and the objective lens 13. The display section 14 is a display device such as a small-sized liquid crystal display. The light path switching section 15 is a total internal reflection mirror, and is constructed so as to move in or out on the light path connecting the ocular lens 12 and the objective lens 13 by a driving section not shown. The erecting optical system 16 included, for example, porro type prisms 16A, 16B as shown in FIG. 3, and guides an image formed by the objective lens 13 after reversing properly to the ocular lens 12. The aforementioned light path switching section 15 is provided between the prisms 16A, 16B and the objective lens 13. The mirror 17 guides a light path from the display section 14 to the light path switching section 15, and a position of the display section 14 through the mirror 17 is almost at a conjugated position with a position where an intermediate image I of an object is formed.

In the observation device 10 explained above, an observer issues an instruction to the light path switching section 15 via an operating section not shown.

If the observation device 10 is intended to use as an observation device for observing an intermediate image I of an object formed by the objective lens 13 through the ocular lens 12, the observer guides a light path between the ocular lens 12 and the objective lens 13 by the light path switching section 15. At this time, focal adjustment with respect to the object to be observed is conducted by moving the objective lens 13 in the direction along with the light path connecting the ocular lens 12 and the objective lens 13.

On the other hand, if the observation device 10 is intended to be used as a display device for observing an image displayed on the display section 14 through the objective lens 13, the observer guides a light path between the display section 14 and the objective lens 13 by the light path switching section 15. At this time, focal adjustment with respect to the display section 14 is conducted by moving the objective lens 13 in the direction along the light path connecting the ocular lens 12 and the objective lens 13.

As explained above, according to the first embodiment, in the observation device that includes the ocular lens, the objective lens and the display section, and observes the intermediate image of the object formed by the objective lens through the ocular lens, the light flux is guided between the objective lens and the ocular lens or between the display section and the objective lens. Accordingly, when guiding the light flux between the objective lens and the ocular lens, the observation device 10 can be used as an observation device, and when guiding the light flux between the display section and the objective lens, it can be used as a display device by observing the display section through the objective lens an observation device. Particularly, the observation device according to the first embodiment can have a display function by using a structure provided therein, so that a small-sized observation device having a display function can be realized.

Further, according to the first embodiment, the erecting optical system is further provided on the light path connecting the ocular lens and the objective lens. Accordingly, when using as the observation device, an image formed by the objective lens can be guided after reversing properly to the ocular lens.

Further, according to the first embodiment, the aforementioned erecting optical system includes the prisms. Accordingly, further downsizing can be realized.

Further, according to the first embodiment, the light path switching section is provided between the prisms and the objective lens. Accordingly, downsizing can be realized by effectively utilizing the space.

Further, according to the first embodiment, the objective lens is movable in the direction along the light path connecting the ocular lens and the objecting lens. Therefore, by moving the objective lens, the focal adjustment with respect to the object to be observed when using as the observation device, and the focal adjustment with respect to the display section when using as the display device can be conducted.

The first embodiment describes the prism included in the erecting optical system 16 by referring to the porro type prisms 16A, 16B as shown in FIG. 3 as an example, however other prisms (for example roof type prism, and the like) may be used. In addition, without using a prism, the erecting optical system 16 may be constructed by using lenses, and the like.

Further, the image displayed on the display section 14 may be any one. For example, a television may be displayed by installing a tuner in the observation device 10, a picture information may be obtained by providing the observation device 10 with a radio function, or the observation device 10 may be provided with a storage medium such as a memory card detachably.

Further, the display section 14 is explained by referring to the case of the small-sized liquid crystal display; however it may be any one such as a plasma display.

Second Embodiment

In the following, a second embodiment according to the present invention is explained by referring to the drawing. In the second embodiment, only the matters different from the first embodiment are explained, and explanation is omitted with respect to the same matters as in the first embodiment. Explanation is done by applying the same symbols to the members similar to the observation device of the first embodiment.

Figure 4:
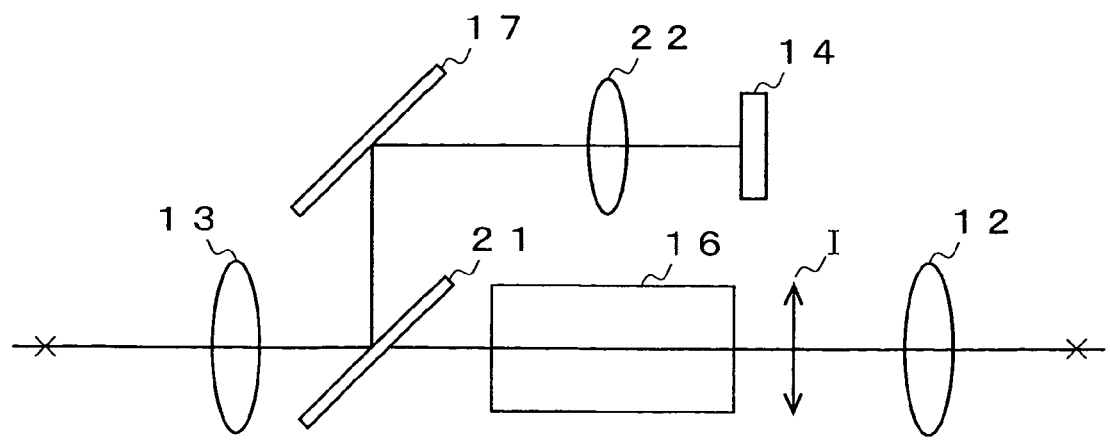
FIG. 4 is a view showing a construction of an observation device 20 according to a second embodiment.

As shown in FIG. 4, an observation device 20 according to the second embodiment includes a light path dividing section 21 in stead of the light path switching section 15 of the observation device 10 according to the first embodiment, and also includes a display lens 22 between the display section 14 and the light path dividing section 21. The light path dividing section 21 is a half mirror.

In the observation device 20 having the construction explained above, an observer can observe, when observing from the ocular lens 12 side, the intermediate image I of the object by utilizing the light flux guided between the objective lens 13 and the ocular lens 12, and can observe, when observing from the objective lens 13 side, the display section 14 by utilizing the light flux guided between the display section 14 and the objective lens 13.

As explained above, according to the second embodiment, in the observation device that includes the ocular lens, the objective lens and the display section, and observes the intermediate image of the object formed by the objective lens through the ocular lens, the light flux is guided between the objective lens and the ocular lens and also the light flux is guided between the display section and the objective lens. Accordingly, the observation device can be realized by utilizing the light flux guided between the objective lens and the ocular lens, and the display device can be realized by utilizing the light flux guided between the display section and the objective lens and by observing the display section through the objective lens. Particularly, because there can be provided with a display function by applying the construction of the observation device, a small-sized observation device having a display function can be realized.

Further, according to the second embodiment, a field of view can be made wider when observing the display section through the objective lens by additionally including the display lens between the light path dividing section and the display section.

Further, according to the second embodiment, a simple construction without a movable part can be made by using a half mirror as the light path dividing section 21.

Third Embodiment

In the following, a third embodiment according to the present invention is explained by referring to the drawing. In the third embodiment, only the matters different from the first embodiment are explained, and explanation thereof is omitted. Explanation is done by applying the same symbols to the members similar to the observation device of the first embodiment.

Figure 5:
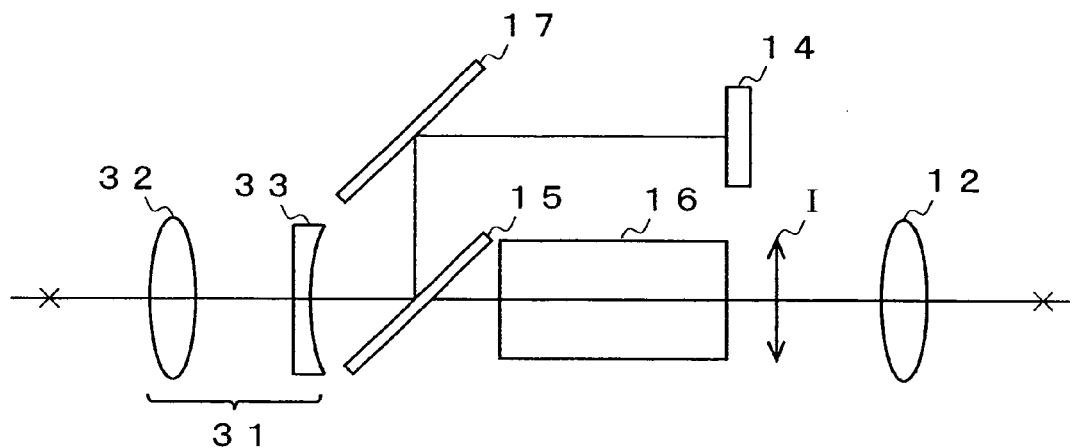
FIG. 5 is a view showing a construction of an observation device 30 according to a third embodiment.

As shown in FIG. 5, an observation device 30 according to the third embodiment includes objective lens 31 instead of the objective lens 13 of the observation device 10 according to the first embodiment. The objective lens 31 is composed of a convex lens 32 and an internal focusing lens 33. And only the internal focusing lens 33 in the objective lens 31 is movable in the direction along the light path connecting the ocular lens 12 and the objective lens 31.

In the observation device 30 having the construction explained above, an observer issues an instruction, as with the first embodiment, to the light path switching section 15 via the operating section not shown.

Then, as with the first embodiment, the observer conducts respective observations by switching the light path with the light path switching section 15. For the focal adjustment with respect to the display section 14, and the focal adjustment with respect to the object to be observed, different from the first embodiment, only the internal focusing lens 33 in the objective lens 31 is moved in the direction along the light path connecting the ocular lens 12 and the objective lens 13. Accordingly, it is possible to reduce the moving range necessary to move the lens for focal adjustment.

As explained above, according to the third embodiment, the objective lens is composed of a plurality of lenses, and a part of the lenses can move in the direction along the light path connecting the ocular lens and the objective lens. Accordingly, in addition to the effects similar to those of the observation device 10 of the first embodiment, further downsizing can be expected.

Fourth Embodiment

In the following, a fourth embodiment according to the present invention is explained by referring to the drawing. In the fourth embodiment, only the matters different from the first embodiment are explained, and explanation is omitted with respect to the same matters as in the first embodiment. Explanation is done by applying the same symbols to the members similar to the observation device of the first embodiment.

Figure 6:
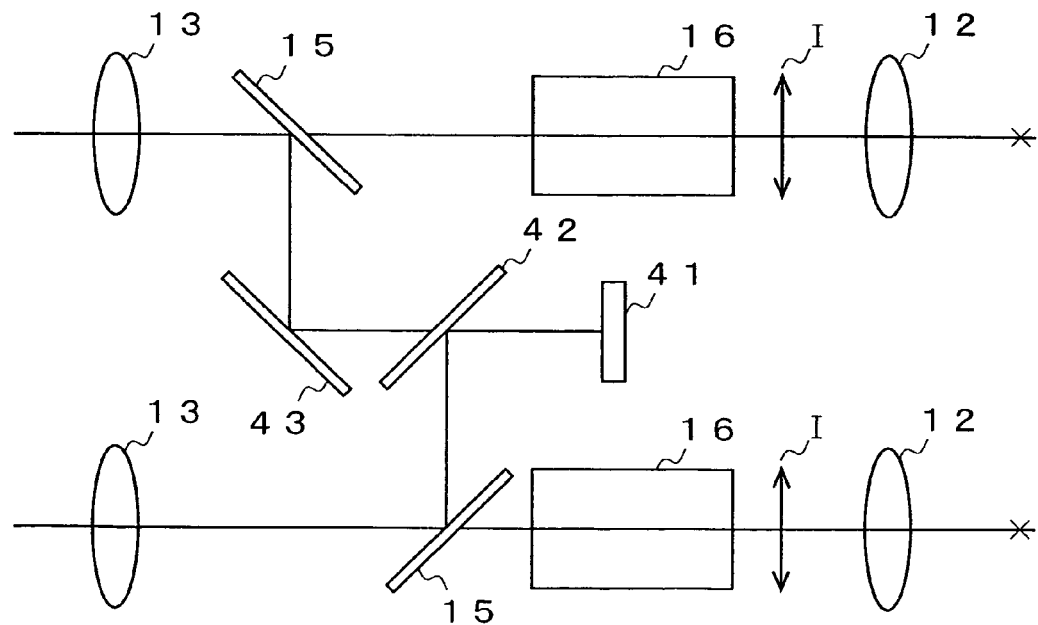
FIG. 6 is a view showing a construction of an observation device 40 according to a fourth embodiment.
Figure 7:
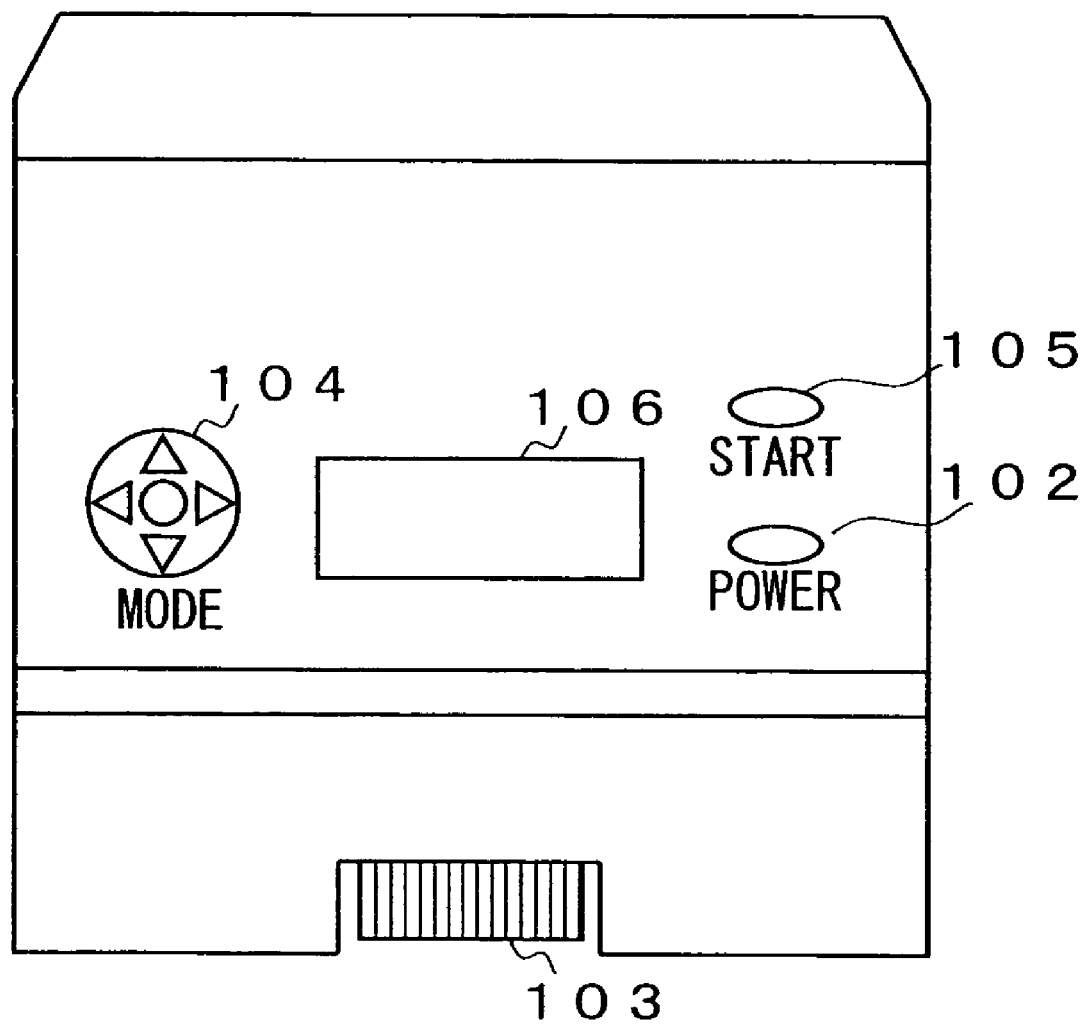
FIG. 7 is a top outside view showing binoculars 101 according to a fifth embodiment.

An observation device 40 according to the fourth embodiment includes, as shown in FIG. 6, the ocular lens 12, the objective lens 13, the light path switching section 15 and the erecting optical system 16 similar to the observation device 10 according to the first embodiment in the right and left portions, respectively, and includes a display section 41, a half mirror 42 and a mirror 43 which are shared for the right and left portions.

The display section 41 has the same construction as that of the display section 14 of the observation device 10 according to the first embodiment. An image displayed on the display section 41 is divided into two images by the half mirror 42, and is guided to the right and left respective objective lenses 13 through the right and left respective light path switching sections 115. The observation device 40 has an optical element (for example a dummy glass and the like) in order to make a light path length from the objective lens 13 to the display section 41 in the right portion equal to that in the left portion respectively.

Note that the half mirror 42 corresponds to the dividing optical system stated in claims.

In the observation device 40 having the constructions as explained above, an observer issues an instruction, as in the first embodiment, to the light path switching section through the operating section not shown.

Then, the observer conducts, as with the first embodiment, the respective observations by switching the light path by the respective right and left light path switching sections 15. When using as a display device, the observer can observe one display section 41 with the right and left eyes at the same time.

Also, the right and left portions may be structured the same as the observation devices explained in the first embodiment to the third embodiment.

As explained above, according to the fourth embodiment, the right and left portions have the same constructions as the observation devices explained in the first embodiment to the third embodiment. Accordingly, the present invention can also be applied to an observation device such as binoculars which allows observation with the right and left eyes at the same time.

According to the fourth embodiment, further provided is the dividing optical system that divides and guides the image displayed on the display section to the right and left objective lenses. Accordingly, when applying the present invention to the observation device allowing observation with the right and left eyes at the same time, because the display section can be shared, downsizing can be realized. In addition, it is possible to avoid problems such as a positioning misalignment between the two display sections and a quality difference of the images on the two display sections, which are caused in the case where display sections are provided in the right and left portions respectively.

Also, it is possible to implement the invention by combining the constructions and functions of the observation devices according to the first embodiment to the fourth embodiment.

The following embodiments describe the observation device according to the present invention with an eye-fatigue relief function with reference to the drawings. During use of the observation device, an observer sometimes may gaze an observation object. In such a case, the observer does not move the cyclotome, which may cause eye fatigue and loss of visual acuity. In view of solving the problem, provision of an eye-fatigue relief function as explained below can help relieving the eye fatigue with ease.

Each of the following embodiments uses binoculars as one example of the observation device according to the present invention. In each of the following embodiments, the binoculars have a mode for observing a remote object and a mode for relieving the eye fatigue. The observer observes an object from an ocular lens side mentioned later in the mode for observing a remote object, and from an objective lens side mentioned later in the mode for relieving the eye fatigue (explained later in detail).

Fifth Embodiment

Binoculars 101 according to a fifth embodiment have a binocular mode for observing a remote object and first and second eye-fatigue relief modes for relieving eye fatigue. In the first eye-fatigue relief mode an eye-fatigue relief operation is performed by using an observation image with the binoculars, and in the second eye-fatigue relief mode an eye-fatigue relief operation is performed by using an image for relieving the eye fatigue.

The binoculars 101 include a power button 102, a focus knob 103 used for focusing of the binoculars, a mode button 104 to set the aforementioned modes, a start button 105 to start the operation in each mode, and an information display section 106 to display various kinds of information. The information display section 106 displays a kind of the mode set by the mode button 104 and the like.

Figure 8:
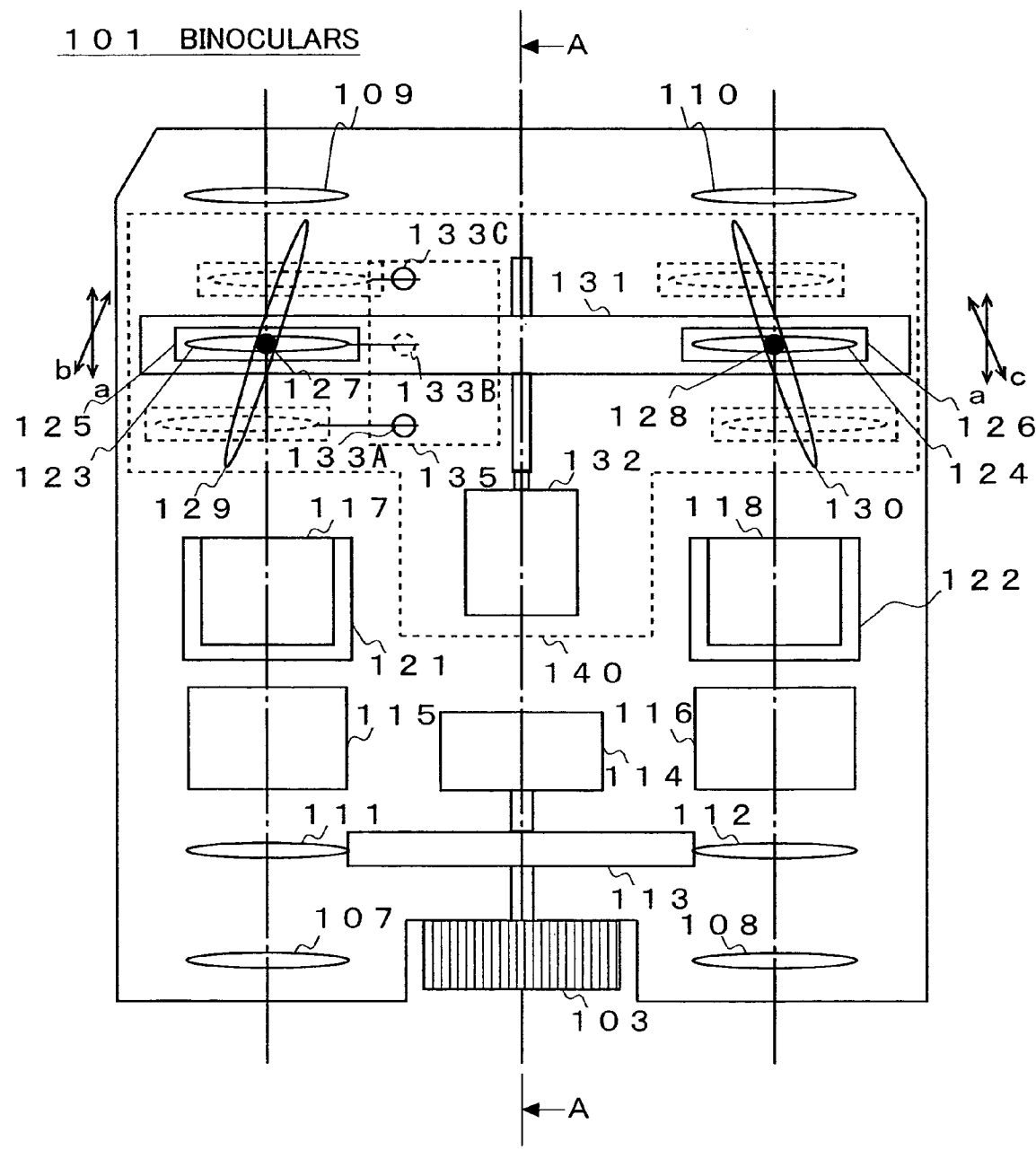
FIG. 8 is a view showing an internal construction of the binoculars 101 according to the fifth embodiment.

Further, the binoculars 101 include, as shown in the internal construction view of FIG. 8, a left ocular lens 107, a right ocular lens 108, a left objective lens 109, a right objective lens 110, a left focus lens 111 and a right focus lens 112 relating to focus slide, a focus-lens moving section 113 which moves the left focus lens 111 and the right focus lens 112 in conjunction with the aforementioned focus knob 103, a detecting section 114 which detects a distance of movement of the focus lens, a left erecting prism 115 and a right erecting prism 116 which convert an inverted image to an erected image.

When an observer operates the focus knob 103 for focusing, the focus lens moving section 113 moves in conjunction with this, and moves the left focus lens 111 and the right focus lens 112.

Figure 9A:
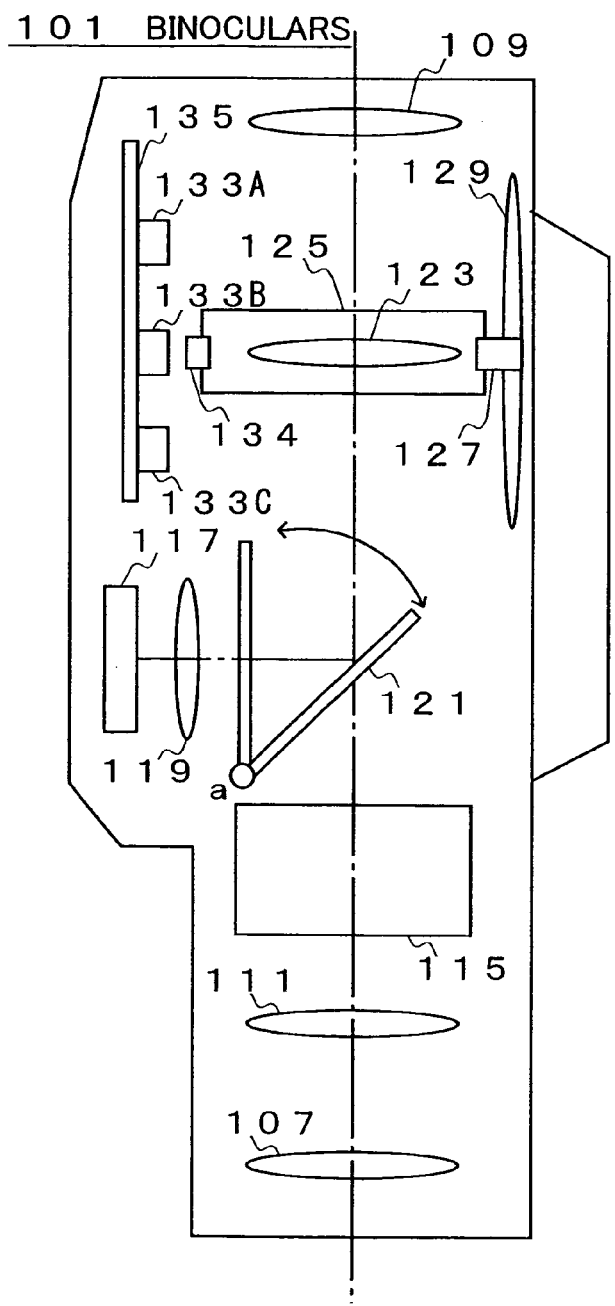
FIG. 9 is an internal section view of the binoculars 101 according to the fifth embodiment.

Further, the binoculars 101, as shown in the internal construction view of FIG. 8 and in FIG. 9A which is an A-A sectional view of FIG. 8, have the same construction in the right and left portions. In addition, the binoculars 101 include a left display section 117 and a right display section 118 which display the image for relieving the eye fatigue, an image-forming lens for the left display section 119, an image-forming lens for the right display section 120 (not shown), and also include a left reflecting mirror 121 and a right reflecting mirror 122. The left display section 117 and the right display section 118 are display devices such as a small-sized liquid crystal display, and are provided on the light paths branched from the light paths connecting the left ocular lens 107 and right ocular lens 108 with the left objective lens 109 and right objective lens 110.

The left reflecting mirror 121 and the right reflecting mirror 122 are provided on the light paths connecting the left ocular lens 107 and right ocular lens 108 with the left objective lens 109 and right objective lens 110, and the light paths connecting the left display section 117 and right display section 118 with the left objective lens 109 and right objective lens 110, and are optical elements which switch the light fluxes guided to the light paths in the right and left portions at the same time. The left reflecting mirror 121 and the right reflecting mirror 122 can be moved at the same time, by a mirror driving section not shown, into or off the optical axis connecting the left ocular lens 107 and right ocular lens 108 with the left objective lens 109 and right objective lens 110.

Figure 9B:
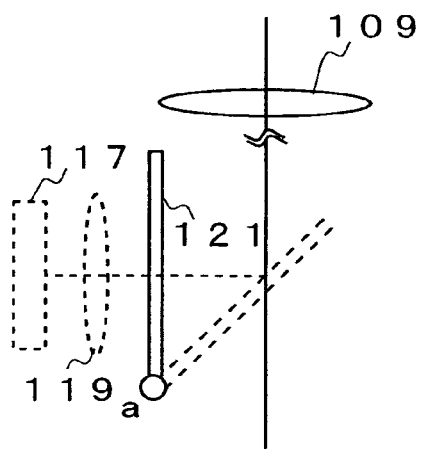
Figure 9C:
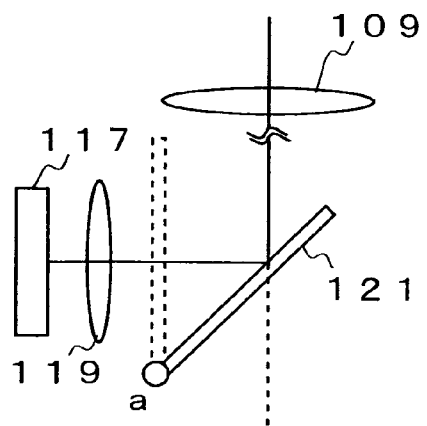

As shown in FIG. 8, because the construction of the left reflecting mirror 121 and the right reflecting mirror 122 are the same, the left reflecting mirror 121 is explained by referring to FIG. 9A to FIG. 9C.

The left reflecting mirror 121 is rotated, as shown in FIG. 9A, by the mirror driving section not shown, around an axis a, and can be moved onto or off the optical axis connecting the left ocular lens 107 and the left objective lens 109. As shown in FIG. 9B, when the left reflecting mirror 121 is moved off from the optical axis connecting the left ocular lens 107 and the left objective lens 109, the left objective lens 109 is positioned on an optical axis of the left ocular lens 107, a light flux is guided between the left objective lens 109 and the left ocular lens 107, this positioning is carried out when conducting the binocular mode and the first eye-fatigue relief mode.

On the other hand, as shown in FIG. 9C, when the left reflecting mirror 121 is moved onto the optical axis connecting the left ocular lens 107 and the left objective lens 109, the left display section 117 is positioned on an optical axis of the left objective lens 109, a light flux is guided between the display section 117 and the left objective lens 109, this positioning is carried out when conducting the second eye-fatigue relief mode.

Note that the right reflecting mirror 122 has also the same construction as that of the aforementioned left reflecting mirror 121.

Namely, by moving the left reflecting mirror 121 and the right reflecting mirror 122, the light flux is guided between the left objective lens 109 and right objective lens 110 and between the left ocular lens 107 and right ocular lens 108 or between the left display section 117 and right display section 118 and between the left objective lens 109 and right objective lens 110. Therefore, only moving the left reflecting mirror 121 and the right reflecting mirror 122 makes it possible to switch the modes easily.

Further the binoculars 101 includes a position-changing section 140 which is provided on light paths connecting the left objective lens 109 and right objective lens 110 and the left reflecting mirror 121 and right reflecting mirror 122, and in the first eye-fatigue relief mode and the second eye-fatigue relief mode, changes a position of an intermediate image observed by an observer in an optical axis direction and a convergent direction of eyes of observer. The position-changing section 140 has a left shift lens 123, a right shift lens 124, and a left supporting part 125 and a right supporting part 126 which support the left shift lens 123 and the right shift lens 124, respectively. Also there are provided a left cam pin 127 and a right cam pin 128 which are connected with the left supporting part 125 and the right supporting part 126, respectively, and a left cam groove 129 and a right cam groove 130 which correspond to the a left cam pin 127 and the right cam pin 128, respectively.

The position-changing section 140 includes, as shown in FIG. 8 and FIG. 9, a shift supporting part 131 which supports the left supporting part 125 and the right supporting part 126, a shift lens driving section 132 which is connected with the shift lens supporting part 131 and drives the shift lens supporting part 131, hall elements 133A-133C to detect a position of the shift lens supporting part 131, and a magnet 134.

The shift lens driving section 132 drives the supporting part 31 in the direction of the arrow a in FIG. 8. When the supporting part 31 is driven in the direction of the arrow a in FIG. 8, the left cam pin 127 and the right cam pin 128 connected with the left supporting part 125 and the right supporting part 126 are moved in the directions of the arrows b and c in FIG. 8 along the left cam groove 129 and the right cam groove 130. Therefore, the left shift lens 123 and the right shift lens 124 are moved in the directions of the arrows b and c in FIG. 8.

The positions of the left shift lens 123 and the right shift lens 124 are detected in accordance with the positional relation of hall elements 133A-133C and a magnet 134. In FIG. 8, the positions of the left shift lens 123 and the right shift lens 124 indicated by solid lines are referred to as initial positions of the left shift lens 123 and the right shift lens 124, and the positions indicated by dashed lines above and below the initial positions are referred to as limit positions of the left shift lens 123 and the right shift lens 124.

In this manner, by moving the left shift lens 123 and the right shift lens 124, in the first eye-fatigue relief mode and the second eye-fatigue relief mode, a position of an intermediate image observed from the side of the left objective lens 109 and the right objective lens 110 by an observer can be moved in an optical axis direction and a convergent direction of eyes of the observer.

Figure 10:
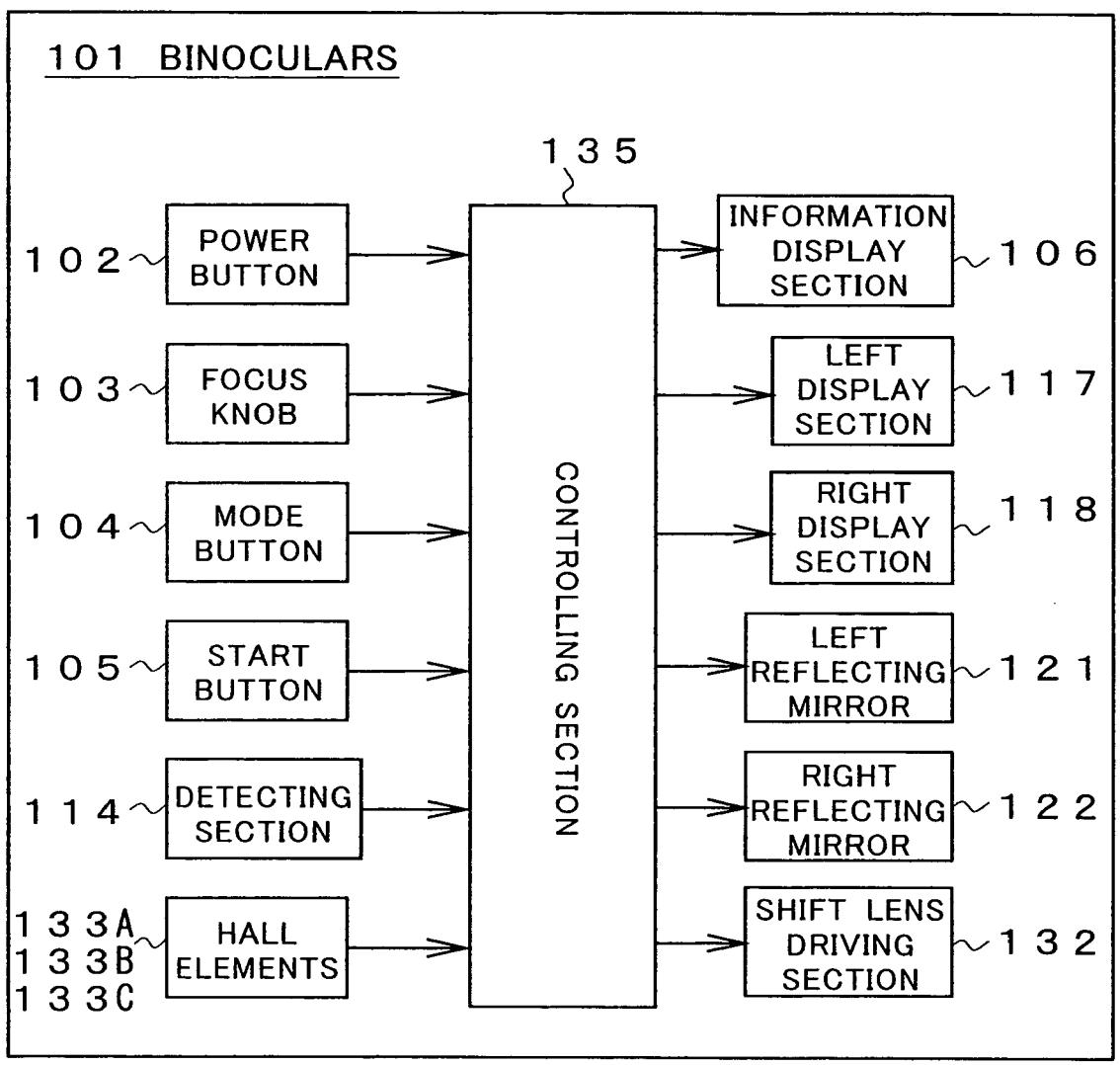
FIG. 10 is a control block diagram of the binoculars 101 according to the fifth embodiment.

In addition, the binoculars 101 include, as shown in FIG. 8, a controlling section 135 in the neighborhood of the hall elements 133A-133C. FIG. 10 is a control block diagram of the binoculars 101. The controlling section 135 detects, as shown in FIG. 10, the conditions of operating members such as the power button 102, the mode button 104 and the start button 105 and also the conditions of the detecting section 114 and the hall elements 133A-133C. The controlling section 135 also controls the left display section 117 and the right display section 118, the mirror driving section not shown of the left reflecting mirror 121 and the right reflecting mirror 122, and the shift lens driving section 132.

Figure 11:
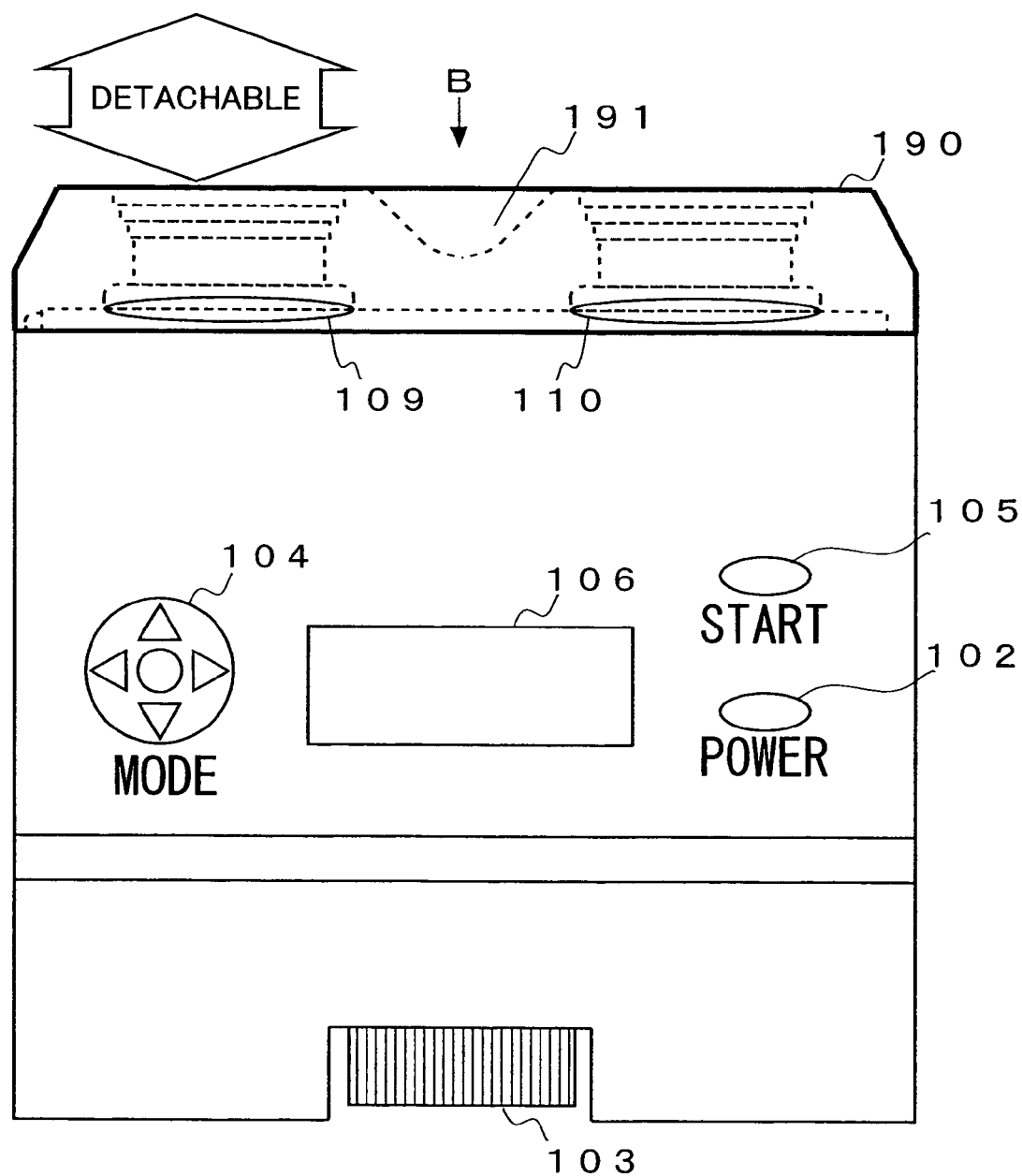
FIG. 11 is an explanatory view showing an eye pad member 190.
Figure 12A:
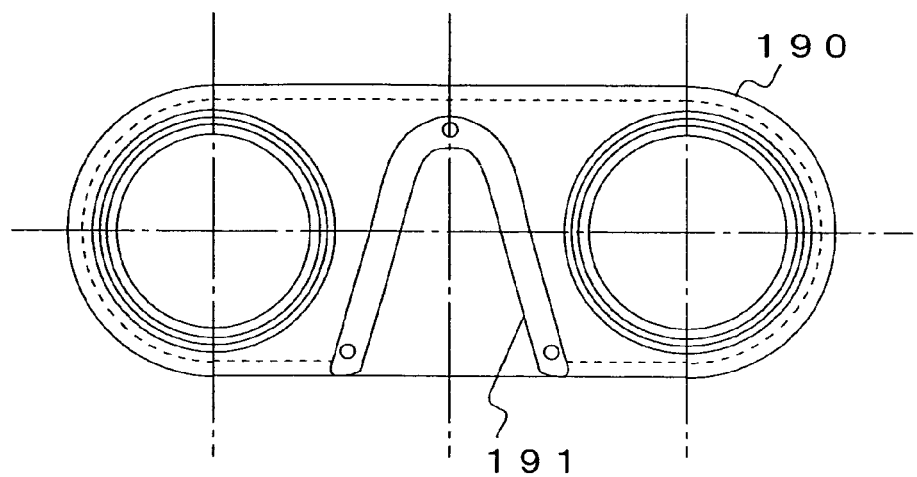
FIG. 12 is an explanatory view showing a nose relief concave member 191.

Further, the binoculars 101 include, as shown in FIG. 11, an eye pad member 190 in the neighborhood of the left objective lens 109 and the right objective lens 110. The binoculars 101 include the eye pad member 190 in order to enhance a sense of use of the observer when the observer observes from the left objective lens 109 and the right objective lens 110. The eye pad member 190 is detachable from the binoculars 101, and includes a nose relief concave member 191 at a portion where a nose is in touch. FIG. 12A shows FIG. 11 seen from the direction B. Parts of the eye pad member 190 which correspond to the left objective lens 109 and the right objective lens 110 are configured in the shape of steps in order to protect the eyes from a flare. Such a shape for flare protection can prevent an excessive outside light, and it is usable as a hood for general observation through the binoculars 101.

The nose relief concave member 191 is made of a shape-memorable material, and is formed into a shape to go along a profile of the nose of an observer.

In this manner, the provision of the eye pad member 190 in the neighborhood of the left objective lens 109 and the right objective lens 110 allows the observer to use the binoculars stably, which may bring about an effect to lessen the discomfort of the observer while wearing them. In addition, the flare protecting shape can prevent an excessive outside light The eye pad member 190 may be integrated with the main body (not detachable), or may have a fold-down mechanism to be able to move into or out of the main body.

In addition, the material of the eye pad member 190 may be any one such as rubber, resin, and plastic. These materials may be combined depending on portions to be used. It may be made of the shape-memorable material as the nose relief concave member 191.

Further, in order to be usable for an observer with glasses, the eye pad member 190 may have a shape that covers all the glasses. The parts corresponding to the left objective lens 109 and the right objective lens 110 are shaped in a perfect circle as a way of example, however, they may have any shapes such as a landscape ellipse and a right and left integrated shape.

Figure 12B:
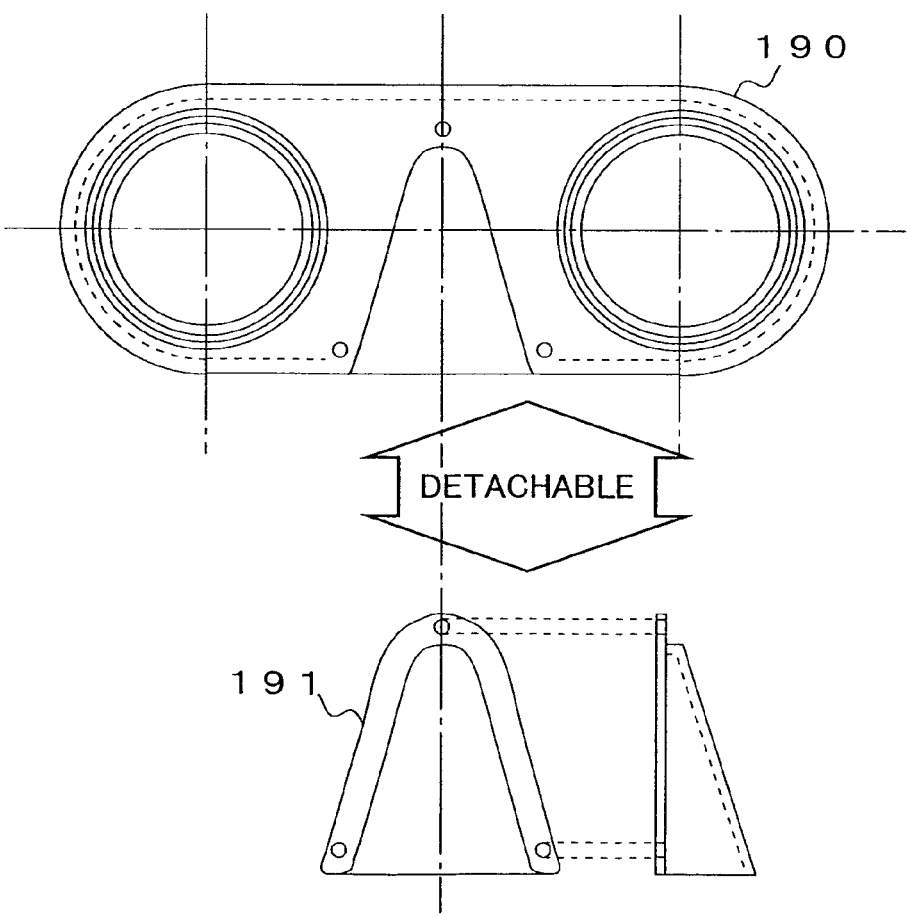

Further, the nose relief concave member 191 is constructed, as shown in FIG. 12B, so as to be detachable from the eye pad member 190. For example, by making members that adapt to a child use, an adult use, and the like ready beforehand, the member may be changeable.

In the binoculars 101 having the constructions explained above, when the power button 102 is turned on, the controlling section 135 detects it, and a certain mode is set by the mode button 104, and the controlling section 135 watches until the start button 105 is pressed. The mode set at this time is any one of the aforementioned binocular mode, first eye-fatigue relief mode and second eye-fatigue relief mode. When the start button 105 is pressed, the controlling section 5 controls each section as in the following manner according to the set mode.

(1) Binocular Mode

When the binocular mode is set, the controlling section 135 moves firstly the left shift lens 123 and the right shift lens 124 to the initial position. Then, the left reflecting mirror 121 and the right reflecting mirror 122 are moved off, as explained in FIG. 9B, from the optical axis of the left ocular lens 107 and the right ocular lens 108, and the left objective lens 109 and the right objective lens 110 are positioned on the optical axis of the left ocular lens 107 and the right ocular lens 108. By positioning like this, the light fluxes are guided between the left objective lens 109 and right objective lens 110 and the left ocular lens 107 and right ocular lens 108, and the observer can observe a remote object from the side of the left ocular lens 107 and the right ocular lens 108.

(2) First Eye-fatigue Relief Mode

When the first eye-fatigue relief mode is set, the controlling section 135 moves firstly the left shift lens 123 and the right shift lens 124 to the initial position. Then, the left reflecting mirror 121 and the right reflecting mirror 122 are moved off, as explained in FIG. 9B, from the optical axis of the left ocular lens 107 and the right ocular lens 108, and the left objective lens 109 and the right objective lens 110 are positioned on the optical axis of the left ocular lens 107 and the right ocular lens 108. By positioning like this, the light fluxes are guided between the left objective lens 109 and right objective lens 110 and the left ocular lens 107 and right ocular lens 108.

And the controlling section 135 moves the left shift lens 123 and the right shift lens 124 reciprocally to the both limit positions that sandwich the initial position via the shift lens driving section 132. By moving the left shift lens 123 and the right shift lens 124 like this, a position of an intermediate image observed by an observer from the side of the left objective lens 109 and the right objective lens 110 is changed in an optical axis direction and a convergent direction of eyes of observer. Accordingly, motion of the cyclostomes of the eyes of the observer can be promoted.

Particularly, in the first eye-fatigue relief mode, because the light fluxes are guided between the left objective lens 109 and right objective lens 110 and the left ocular lens 107 and right ocular lens 108, the eye-fatigue relief operation can be done by using an observation image by the binoculars 101. Therefore, the observer observes a favorite appearance from the side of the left objective lens 109 and the right objective lens 110 of the binoculars 101, and relieves eye fatigue by using the observation image.

(3) Second Eye-fatigue Relief Mode

When the second eye-fatigue relief mode is set, the controlling section 135 moves firstly the left shift lens 123 and the right shift lens 124 to the initial position. Then, the left reflecting mirror 121 and the right reflecting mirror 122 are moved, as explained in FIG. 9C, onto the optical axis of the left ocular lens 107 and the right ocular lens 108, and the left display section 117 and the right display section 118 are positioned on the optical axis of the left objective lens 109 and the right objective lens 110. By positioning like this, the light fluxes are guided between the left display section 117 and right display section 118 and the left objective lens 109 and right objective lens 110.

Then, the controlling section 135 displays images for relieving eye fatigue on the left display section 117 and the right display section 118, the image for relieving eye fatigue is an image that includes a picture (for example, a picture of an article being capable of moving backward and forward such as an airplane or a car) of an eye mark (an object that attracts the attention of the observer) at a position where the observer can easily recognize and easily focuses the observer's sight (near the center). Such images are previously recorded in a memory not shown in the controlling section 135.

Then, the controlling section 135 moves the left shift lens 123 and the right shift lens 124 reciprocally to the both limit positions that sandwich the initial position via the shift lens driving section 132. By moving the left shift lens 123 and the right shift lens 124 like this, a position of an intermediate image observed by an observer from the side of the left objective lens 109 and the right objective lens 110 is changed in an optical axis direction and a convergent direction of eyes of the observer. Accordingly, motion of the cyclostomes of the eyes of the observer can be promoted.

Particularly, in the second eye-fatigue relief mode, because the light fluxes are guided between the left display section 117 and right display section 118 and the left objective lens 109 and right objective lens 110, the eye-fatigue relief operation can be done by using the image for relieving eye fatigue. Therefore, by using the image specified to relieve eye fatigue and performing the eye-fatigue relief operation from the side of the left objective lens 109 and the right objective lens 110 of the binoculars 101, it is expected that the effects of relieving eye fatigue be increased.

As explained above, the binoculars according to the fifth embodiment are provided the ocular lens and the objective lens. A light flux is guided between the objective lens and the ocular lens or between the display section and the objective lens, and also the position of the intermediate image observed by the observer is changed in the optical axis direction and the convergent direction of the eyes of observer. Accordingly, while using the observation device (binoculars), the observer can be relieved from the eye fatigue with ease. Particularly, according to the fifth embodiment, the observation device (binoculars) employs a general structure provided therein to perform the eye fatigue relief operation, so that the size thereof can be almost the same as that of a general observation device (binoculars), and it can relieve the eye fatigue with ease.

Further, according to the fifth embodiment, in response to the operation of the observer, one of the first to third modes is set, the first mode where the light flux is guided between the objective lens and the ocular lens, the second mode where the position of the intermediate image is changed in the optical axis direction and the convergent direction of eyes of the observer while the light flux is guided between the objective lens and the ocular lens, and the third mode where the position of the intermediate image is changed in the optical axis direction and the convergent direction of eyes of the observer while the light flux is guided between the display section and the ocular lens. Accordingly, the device can be used as a general observation device (binoculars) for observing a remote object in the first mode, and as a device for relieving eye fatigue in the second mode and the third mode. Particularly, in the second mode, the eye-fatigue relief operation can be done by using the observation image with the binoculars 101. Therefore, the observer can observe a favorite object from the left objective lens 109 and the right objective lens 110 of the binoculars 101, and relieve his/her eye fatigue by using the observation image. In the third mode, it is expectable to obtain a good eye-fatigue relief effect through the eye fatigue relief operation using the image dedicated to the eye fatigue relief.

Moreover, although the fifth embodiment describes the example where the position of the intermediate image observed by the observer is changed in the optical axis direction and the convergent direction of eyes of the observer, it may be changed only in the optical axis direction, or may be changed only in the convergent direction.

Although the fifth embodiment describes the example where the position of the intermediate image observed by the observer is changed in the optical axis direction and the convergent direction of eyes of the observer by moving the left shift lens 123 and the right shift lens 124, it may be changed only in the optical axis direction by moving the left shift lens 123 and the right shift lens 124, or may be changed only in the convergent direction by moving the left display section 117 and the right display section 118. In this case, it is preferable to synchronize the movement of the left shift lens 123 and the right shift lens 124 with the movement of the left display section 117 and the right display section 118 in the convergent direction. The position is changed in the optical axis direction by the movement of the left shift lens 123 and the right shift lens 124 and changed in the convergent direction by the movement of the left display section 117 and the right display section 118, so that it is possible to simplify the construction of the position-changing section 140.

In addition, it may be employed that the position of the intermediate image observed by the observer is changed in the optical axis direction and the convergent direction of eyes of the observer by moving the left shift lens 123 and the right shift lens 124, and further a quantity of change in the convergent direction is increased by moving the left display section 117 and the right display section 118.

Figure 13:
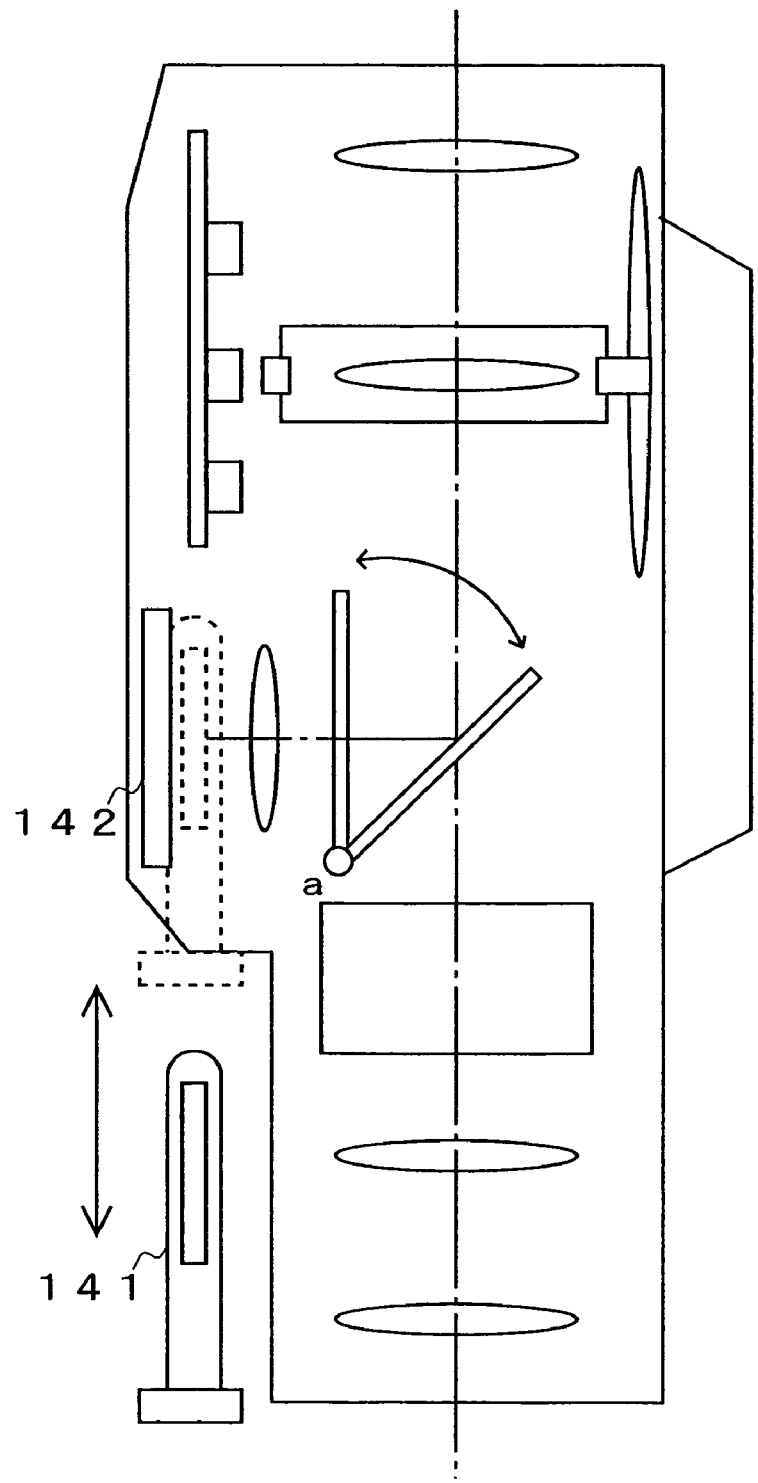
FIG. 13 is another internal section view of the binoculars 101 according to the fifth embodiment.

Although the fifth embodiment describes the example where the left display section 117 and the right display section 118 are displays such as a small-sized liquid crystal display, they may be replaced by a holder 141 installed with a slide film and a back light 142. For example, as shown in FIG. 13, the holder 141 may be detachable to the binoculars 101. Such a construction can save the power, and the observer can conducts the eye-fatigue relief operation by using a favorite slide film.

Moreover, the fifth embodiment describes the example where, by using the left reflecting mirror 121 and the right reflecting mirror 122, the light fluxes are guided between the left objective lens 109 and right objective lens 110 and between the left ocular lens 107 and right ocular lens 108 or between the left display section 117 and right display section 118 and between the left objective lens 109 and right objective lens 110. However, the following construction may be employed.

For example, half mirrors are additionally provided at the positions of the left reflecting mirror 121 and the right reflecting mirror 122, as well as shutters inside and outside of the left and right ocular lenses. When the light fluxes are guided between the left objective lens 109 and right objective lens 110 and the left ocular lens 107 and right ocular lens 108, the shutters are opened and also the displays on the left display section 117 and the right display section 118 are stopped. On the other hand, when the light fluxes are guided between the left display section 117 and right display section 118 and the objective lens 109 and right objective lens 110, the shutters are closed and also the displays on the left display section 117 and the right display section 118 are started.

As another construction thereof, for example, the binoculars may be provided with an EL (Electric luminance) or a transmission type display device such as a transmission type liquid crystal at the positions of the left reflecting mirror 121 and the right reflecting mirror 122, and may be combined with the shutters.

In addition, although the fifth embodiment describes the binoculars 101, the present invention may be applied to a telescope that has one ocular lens and one objective lens. With the telescope, an observer observes an object with one eye, therefore; it may be configured to change a position of an intermediate image observed by the observer not in the convergent direction but only in the optical axis direction.

Sixth Embodiment

In the following, a sixth embodiment according to the present invention is explained by referring to the drawing. In the sixth embodiment, only the matters different from the fifth embodiment are explained.

The binoculars 150 according to the sixth embodiment changes a position of an intermediate image observed by an observer only in the optical axis direction of eyes of the observer in the first eye-fatigue relief mode and the second eye-fatigue relief mode as in the fifth embodiment. Also, The binoculars 150 can adjust a distance between the left and right ocular lenses (distance between the eyes).

Figure 14:
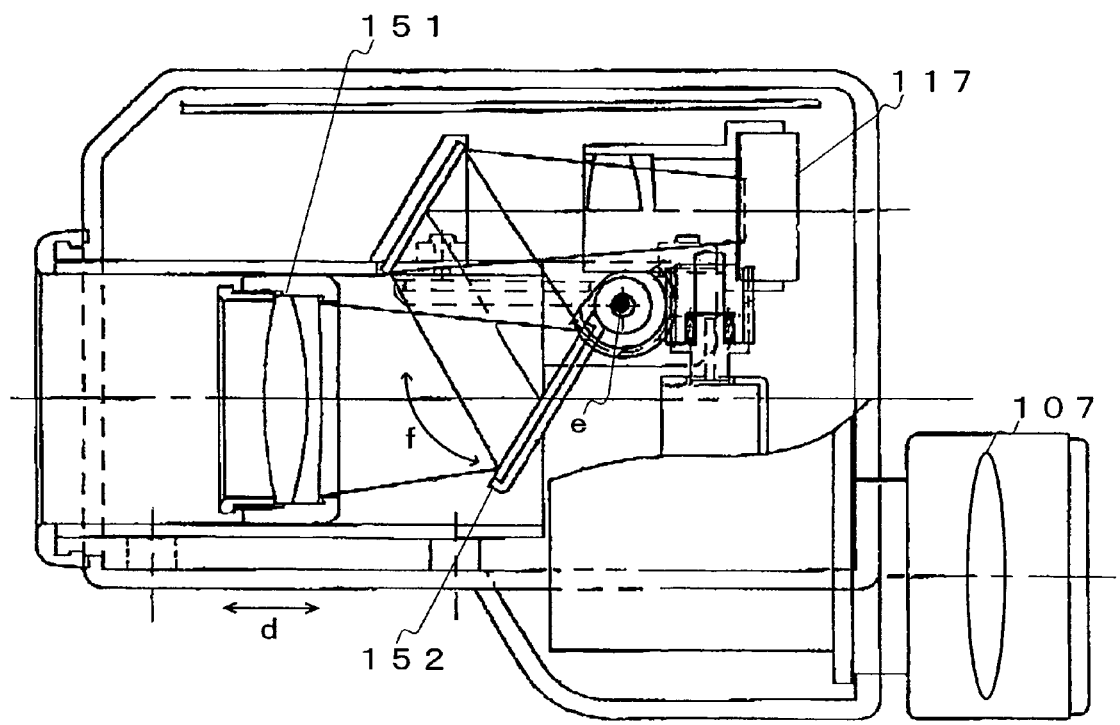
FIG. 14 is a view showing an internal construction of binoculars 150 according to a sixth embodiment.

FIG. 14 is an internal construction view showing the binoculars 150 from the left side. In the present embodiment the same symbols is applied to the members similar to the binoculars 101 of the fifth embodiment. As shown in FIG. 14 the binoculars 150 include a left dual-purpose lens 151 that functions as the left objective lens 109, the left focus lens 111 and the left shift lens 123 of the fifth embodiment. The left dual-purpose lens 151 is movable in the direction of the arrow d in FIG. 14. By moving the position of this left dual-purpose lens 151, an observer can make the focus slide (focal adjustment) of the binoculars 150, and change the position of image observed by the observer from the lens 51 side in the first eye-fatigue relief mode and the second eye-fatigue relief mode. Moreover, when changing the position of the intermediate image, the left dual-purpose lens 151 is moved in a wider range than when making the focal adjustment. The respective movement ranges may be overlapped or separated.

Moreover, the binoculars 150 include a mirror 152 that can rotate in the direction shown by the arrow f around the axis e in FIG. 14, and the left display section 117. By driving the mirror 152, it is possible to switch the light flux guided between the left dual-purpose lens 151 and the left ocular lens 107 and the light flux guided between the left display section 117 and the left dual-purpose lens 151.

The right side portion of the binoculars 150 has the same constructions explained above. The binoculars 150 conduct each operation in accordance with the set mode as the binoculars 101 of the fifth embodiment.

As explained above, the binoculars according to the sixth embodiment is provided with the lens on the light path connecting the ocular lens and the objective lens and movable along the light path, and it performs the focal adjustment of the observation device (binoculars) and changes the position of the intermediate image observed by an observer from the objective lens side in the optical axis direction of the eyes of the observer by moving the position of the lens. Therefore, the shift lens that changes the position of the intermediate image observed by an observer from the objective lens side functions as the objective lens as well as the focus lens that conducts the focal adjustment of the binoculars 150, so that it is possible to simplify the construction thereof in addition to obtaining the same effects as those of the binoculars 101 according to the fifth embodiment.

In the binoculars 150 according to the sixth embodiment, internal space thereof can effectively used by arranging the ocular lens and the display section in the vertical directions the observation state of the binoculars 150 as shown in FIG. 14. Constructing the binoculars 150 as above can make the lateral size of the observation device (binoculars) can be made the same as that of a general observation device (binoculars) can avoid usability from degrading.

The sixth embodiment describes the example where the left dual-purpose lens 151 has dual-purpose functions of the left objective lens 109, the left focus lens 111 and the left shift lens 123, however, the left objective lens 109 may be provided separately.

In addition, the sixth embodiment describes the binoculars 150, however, the present invention may be applied to a telescope that has one ocular lens and one objective lens.

Seventh Embodiment

In the following, a seventh embodiment according to the present invention is explained by referring to the drawings.

The binoculars 160 according to the seventh embodiment have the binocular mode and the eye-fatigue relief mode for relieving the eye fatigue. The eye-fatigue relief mode is a mode where the eye-fatigue relief operation is conducted by using an image for relieving the eye fatigue.

Figure 15:
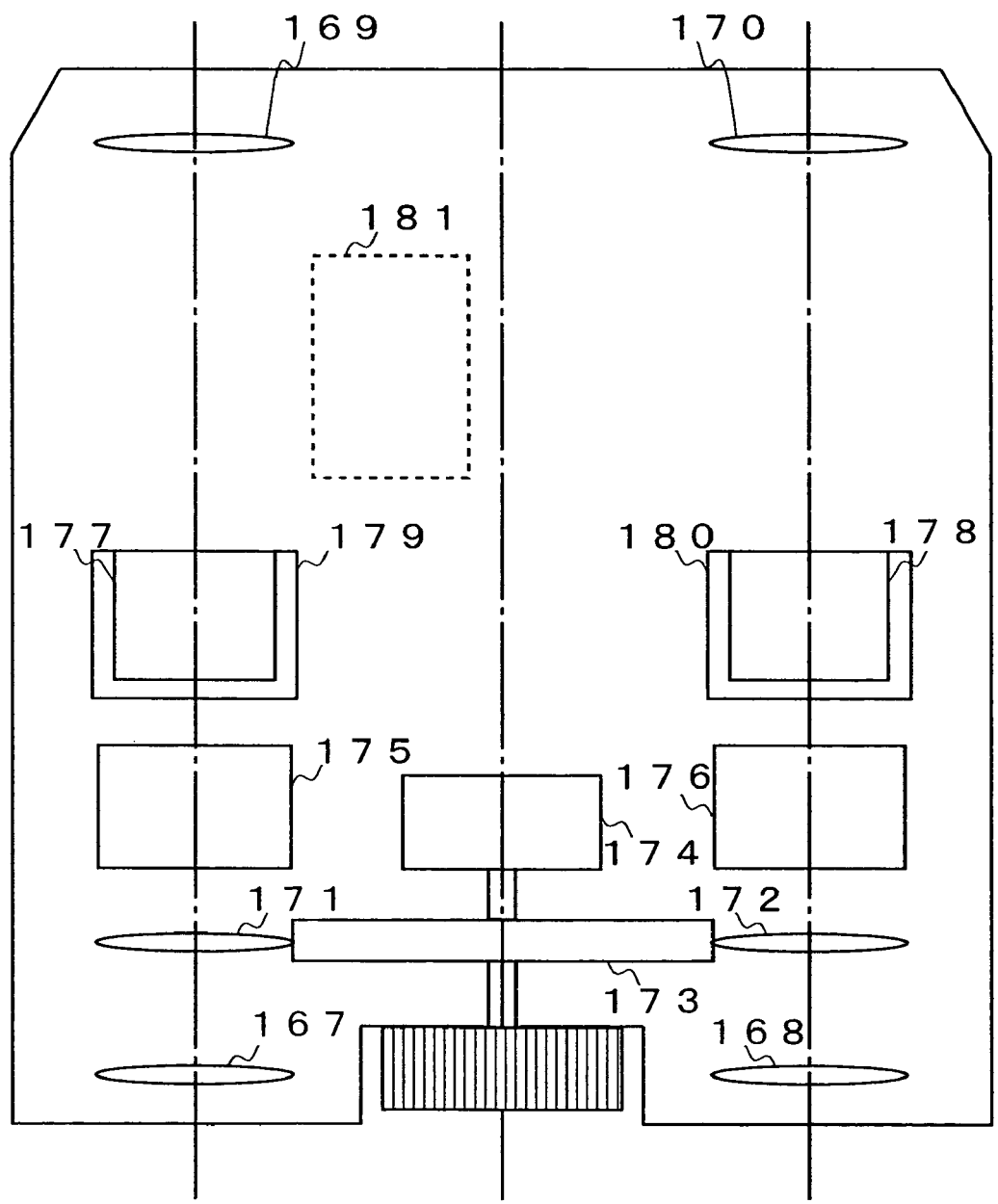
FIG. 15 is a view showing an internal construction of binoculars 160 according to a seventh embodiment.

The binoculars 160 include, as shown in the internal construction view of FIG. 15, a left ocular lens 167, a right ocular lens 168, a left objective lens 169, a right objective lens 170, a left focus lens 171 and a right focus lens 172 relating to focus slide, a focus lens moving section 173 which moves the left focus lens 171 and the right focus lens 172, a detecting section 174 which detects a movement distance of the focus lens, a left erecting prism 175 and a right erecting prism 176 which convert an inverted image to an erected image.

Further, the binoculars 160 include, as same as the binoculars 101 according to the fifth embodiment, a left display section 177 and a right display section 178 which display the image for relieving the eye fatigue, an image-forming lens not shown for the left display section, and an image-forming lens for the right display section not shown, as well as a left reflecting mirror 179 and a right reflecting mirror 180. The left display section 177 and the right display section 178 are display devices such as a small-sized liquid crystal display, and are provided on the light paths branched from the light paths connecting the left ocular lens 167 and right ocular lens 168 with the left objective lens 169 and right objective lens 170.

Further, the left reflecting mirror 179 and the right reflecting mirror 180 are provided on the light paths connecting the left ocular lens 167 and right ocular lens 168 with the left objective lens 169 and right objective lens 170, and the light paths connecting the left display section 177 and right display section 178 with the left objective lens 169 and right objective lens 170, and they are optical elements which switch the light fluxes guided between the left objective lens 169 and right objective lens 170 and between the left ocular lens 167 and right ocular lens 168, and the light fluxes between the left display section 177 and right display section 178 and between the left objective lens 169 and right objective lens 170. The left reflecting mirror 179 and the right reflecting mirror 180 operates same as the left reflecting mirror 121 and the right reflecting mirror 122 of the binoculars 101 according to the fifth embodiment, so that description thereof is omitted.

Namely, by moving the left reflecting mirror 179 and the right reflecting mirror 180, the light fluxes are guided between the left objective lens 169 and right objective lens 170 and between the left ocular lens 167 and right ocular lens 168 or between the left display section 177 and right display section 178 and between the left objective lens 169 and right objective lens 170. Accordingly, only moving the left reflecting mirror 179 and the right reflecting mirror 180 makes it possible to switch the modes easily.

In addition, the binoculars 160 according to the seventh embodiment include a controlling section 181. The controlling section 181 detects the conditions of the detecting section 174 and also controls the left display section 177 and the right display section 178, the mirror driving section not shown of the left reflecting mirror 179 and the right reflecting mirror 180.

Different from the binoculars 101 according to the fifth embodiment, the binoculars 160 according to the seventh embodiment do not have a movement mechanism for changing the position of the intermediate image observed by the observer. Instead, the binoculars 160 according to the seventh embodiment changes the position of the eye mark included in the image for relieving the eye fatigue that is displayed on the left display section 177 and the right display section 178 (explained in detail later). The image for relieving eye fatigue means an image that includes a picture (for example, a picture of an article being capable of moving backward and forward such as an airplane or a car) of an eye mark at a position where the observer can easily recognize and easily focuses the observer's sight (near the center). This picture corresponds to the picture where at least one of shape, brightness and color is specific. The pictures like this are previously recorded in a memory not shown in the controlling section 181.

In the binoculars 160 having the constructions explained above, when a power button not shown is turned on, the controlling section 181 detects it, and a certain mode is set by a mode button not shown, and the controlling section 181 watches until a start button not shown is pressed. The mode set at this time is any one of the aforementioned binocular mode and eye-fatigue relief mode.

When the start button not shown is pressed, the controlling section 181 controls each section as in the following manner according to the set mode.

(1) Binocular Mode

When the binocular mode is set, the controlling section 181, as in the fifth embodiment, moves off the left reflecting mirror 179 and the right reflecting mirror 180, as explained in FIG. 9B, from the optical axis of the left ocular lens 167 and the right ocular lens 168, and the left objective lens 169 and the right objective lens 170 are positioned on the optical axis of the left ocular lens 167 and the right ocular lens 168. By positioning like this, the light fluxes are guided between the left objective lens 169 and right objective lens 170 and the left ocular lens 167 and right ocular lens 168, and the observer can observe a remote object from the side of the left ocular lens 167 and the right ocular lens 168.

(2) Eye-fatigue Relief Mode

In the eye-fatigue relief mode, the controlling section 181 moves the left reflecting mirror 179 and the right reflecting mirror 180, as explained in FIG. 9C, onto the optical axis of the left ocular lens 167 and the right ocular lens 168, and the left display section 177 and the right display section 178 are positioned on the optical axis of the left ocular lens 167 and the right ocular lens 168. By positioning like this, the light fluxes are guided between the left display section 177 and right display section 178 and the left objective lens 169 and right objective lens 170.

Then, the controlling section 181 displays images for relieving eye fatigue on the left display section 177 and the right display section 178. The image for relieving eye fatigue is an image that includes a picture (for example, a picture of an article movable backward and forward such as an airplane or a car) to be an eye mark (an object that attracts the attention of the observer) at a position (near the center) recognizable and focused easily by the observer. Such images are previously recorded in a memory not shown in the controlling section 181.

Then, the controlling section 181 changes the position of the eye mark in the image for relieving the eye fatigue in the convergent direction of the eyes of the observer. Changing the position of the eye mark makes it possible to promote motion of the cyclotome of the eyes of the observer.

As explained above, the binoculars according to the seventh embodiment are provided with the ocular lens and the objective lens and the display section that displays the image including the picture which is specific in at least one of shape, brightness and color. A light flux is guided between the objective lens and the ocular lens and or between the display section and the objective lens, and also at least one of the position and the features of the image displayed on the display section. Accordingly, when using the observation device (binoculars), the eye fatigue can be relieved with ease. Particularly, according to the seventh embodiment, because the eye fatigue relief can be conducted by applying the general construction of an observation device (binoculars), a size is almost the same as that of a general observation device (binoculars), and the eye fatigue can be relieved with ease.

Moreover, the seventh embodiment describes the example where the position of the eye mark is changed in the image displayed on the left display section 177 and the right display section 178 to move the eyes of the observer in the convergent direction, and then promote the eye fatigue relief of the observer. However, the size of the eye mark may be changed. Changing the size of the eye mark can obtain the same effects obtained in the case where the position of intermediate image observed by the observer is changed in the optical axis direction (refer to the fifth embodiment). In addition, both of the position and the size of the eye mark may be changed as well as the shape and brightness and the like.

In addition, although the seventh embodiment describes the binoculars 160, the present invention may be applied to a telescope that has one ocular lens and one objective lens.

Moreover, although the fifth embodiment to the seventh embodiment describe the examples where the image for eye-fatigue relief operation is recorded in the controlling section, it may be configured that the observer selects one of several images prepared in advance.

In the following, an embodiment where an observation is always conducted from an ocular lens side is explained. In each of the following embodiments, binoculars have a mode for observing a remote object and a mode for relieving the eye fatigue. The observer e observes an object from an ocular lens side mentioned later in the mode for observing a remote object and the mode for relieving the eye fatigue (explained in detail later).

Eighth Embodiment

In the following, an eighth embodiment according to the present invention is explained by referring to the drawings.

Binoculars 201 according to the eighth embodiment have a binocular mode for observing a remote object and a first eye-fatigue relief mode and a second eye-fatigue relief mode for relieving eye fatigue. The first eye-fatigue relief mode is a mode that conducts an eye-fatigue relief operation by using an object observed by the binoculars, and the second eye-fatigue relief mode is a mode in which an eye-fatigue relief operation is performed by using an image for relieving the eye fatigue.

The appearance of the binoculars 201 according to the eighth embodiment is the same as that of the binoculars 101 according to the fifth embodiment; therefore, a drawing and description thereof are omitted.

Figure 16:
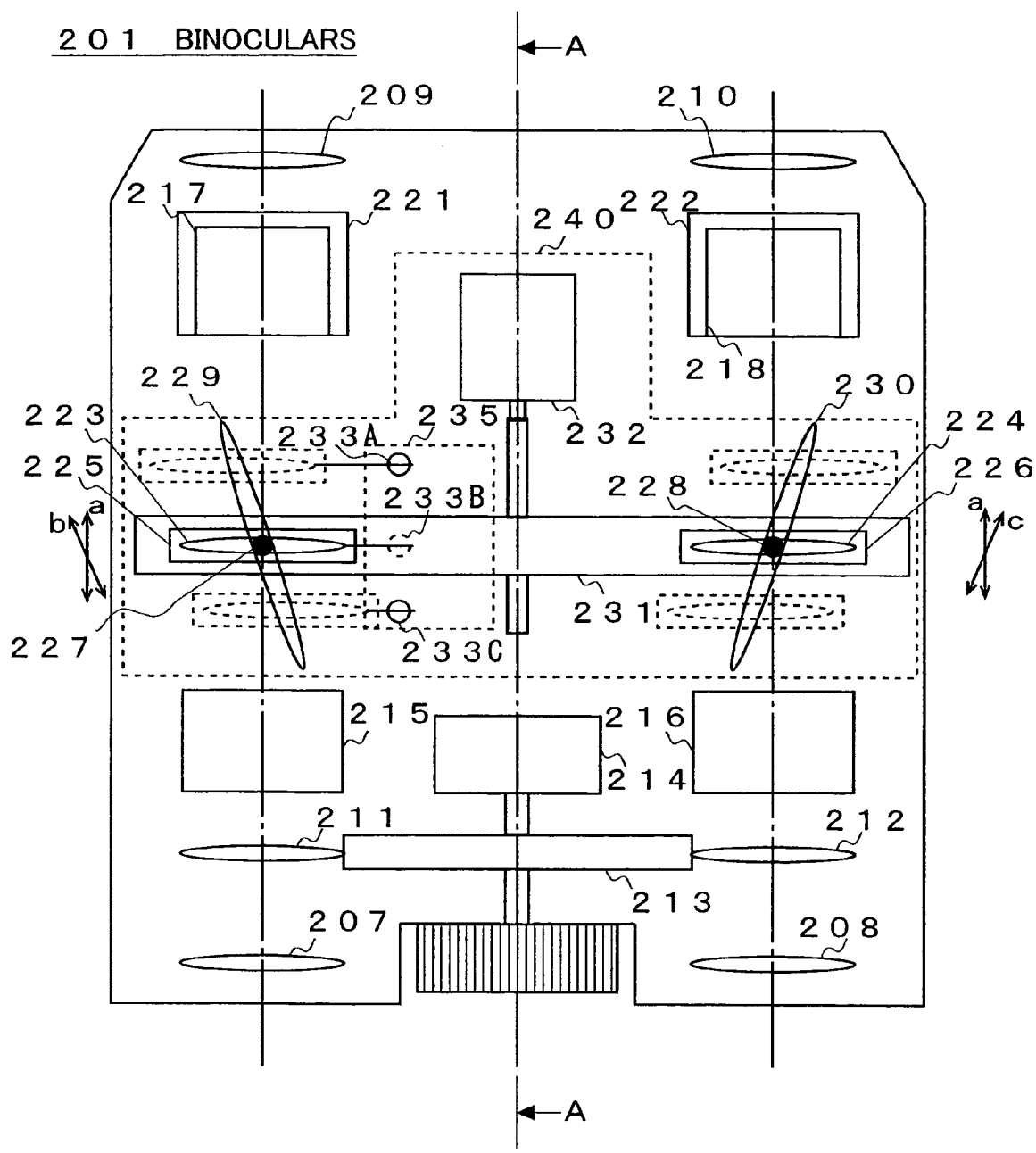
FIG. 16 is a view showing an internal construction of binoculars 201 according to an eighth embodiment.

Further, the binoculars 201 have, as shown in the internal construction view of FIG. 16, same constructions of the binoculars 101 of the fifth embodiment, namely, a left ocular lens 207, a right ocular lens 208, a left objective lens 209, a right objective lens 210, a left focus lens 211 and a right focus lens 212, a focus lens moving section 213, a detecting section 214, a left erecting prism 215 and a right erecting prism 216.

Figure 17A:
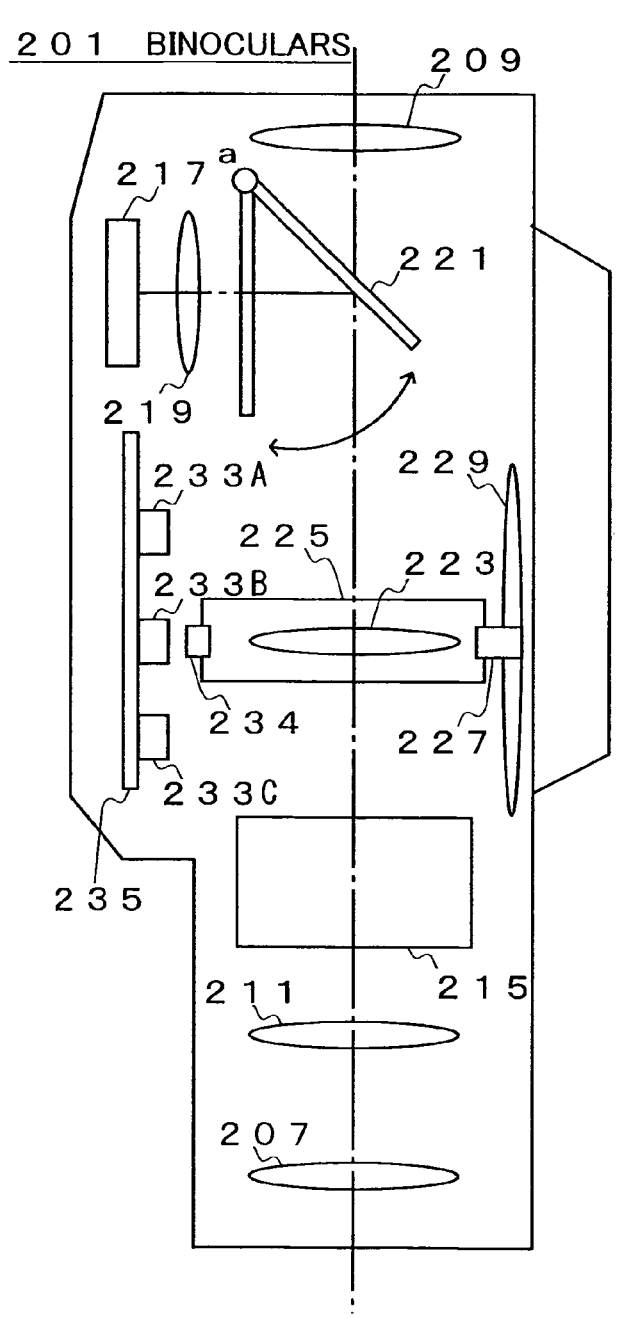
FIG. 17 is an internal section view of binoculars 201 according to the eighth embodiment.

Further, the binoculars 201, as shown in the internal construction view of FIG. 16 and in FIG. 17A which is an A-A sectional view of FIG. 16, have the same constructions in the right and left portions. The binoculars 201 have the same constructions of the binoculars 101 of the fifth embodiment, namely a left display section 217 and a right display section 218, an image-forming lens 219 for the left display section, an image-forming lens 220 for the right display section (not shown). And also the binoculars 201 have constructions that are inversed to the binoculars 101 of the fifth embodiment, namely a left reflecting mirror 221 and a right reflecting mirror 222. The left display section 217 and the right display section 218 are display devices such as a small-sized liquid crystal display, and are provided on the light paths branched from the light paths connecting the left ocular lens 207 and right ocular lens 208 with the left objective lens 209 and right objective lens 210.

The left reflecting mirror 221 and the right reflecting mirror 222 are provided at the position where the light paths connecting the left ocular lens 207 and right ocular lens 208 with the left objective lens 209 and right objective lens 210 and the light paths connecting the left display section 217 and right display section 218 with the left ocular lens 207 and right ocular lens 208 are crossed, and are optical elements which switch the light fluxes guided to the light paths in the right and left portions at the same time. The left reflecting mirror 221 and the right reflecting mirror 222 can be moved at the same time, by a mirror driving section not shown, into or off the light paths connecting the left ocular lens 207 and right ocular lens 208 with the left objective lens 209 and right objective lens 210.

Figure 17B:
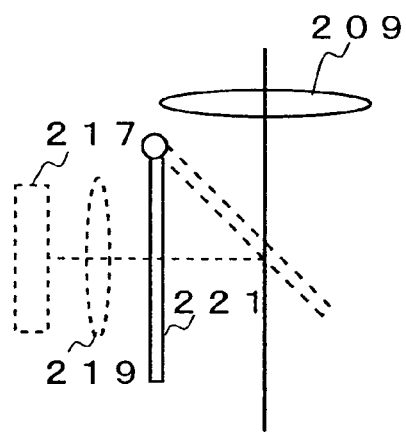
Figure 17C:
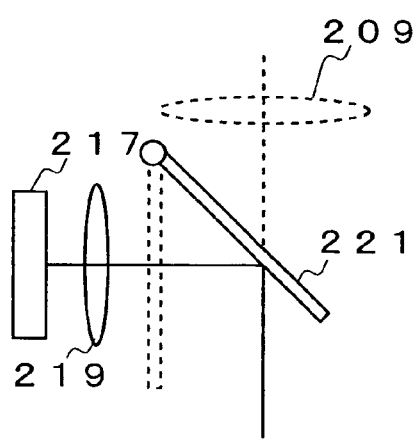

As shown in FIG. 16, because the construction of the left reflecting mirror 221 and the right reflecting mirror 222 are the same, the left reflecting mirror 221 is explained by referring to FIG. 17A to FIG. 17C.

The left reflecting mirror 221 is rotated, as shown in FIG. 17A, by the mirror driving section not shown, around an axis a, and can be moved onto or off the light path connecting the left ocular lens 207 and the left objective lens 209. As shown in FIG. 17B, when the left reflecting mirror 221 is moved off from the light path connecting the left ocular lens 207 and the left objective lens 209, the left objective lens 209 is positioned on a light path passing through the left ocular lens 207, a light flux is guided between the left objective lens 209 and the left ocular lens 207. This positioning is employed during the binocular mode and the first eye-fatigue relief mode.

On the other hand, as shown in FIG. 17C, when the left reflecting mirror 221 is moved onto the light path connecting the left ocular lens 207 and the left objective lens 209, the left display section 217 is positioned on an optical axis of the left ocular lens 207, a light flux is guided between the display section 217 and the left ocular lens 207. This positioning is employed during the second eye-fatigue relief mode.

Note that the right reflecting mirror 222 has also the same construction as that of the aforementioned left reflecting mirror 221.

Namely, by moving the left reflecting mirror 221 and the right reflecting mirror 222, the light fluxes are guided between the left objective lens 209 and right objective lens 210 and between the left ocular lens 207 and right ocular lens 208, or between the left display section 217 and right display section 218 and between the left ocular lens 207 and right ocular lens 208. Accordingly, only moving the left reflecting mirror 221 and the right reflecting mirror 222 can switch the modes easily.

Further the binoculars 201 include a position-changing section 240, as shown in FIG. 16, the position changing section 240 has the same construction as that of the binoculars 101 of the fifth embodiment, namely a left shift lens 223, a right shift lens 224, a left supporting part 225, a right supporting part 226, a left cam pin 227 and a right cam pin 228, and the construction that is inversed to the binoculars 101 of the fifth embodiment, namely a left cam groove 229 and a right cam groove 230.

Further, the position-changing section 240 has, as shown in FIG. 16 and FIG. 17, the same construction as that of the binoculars 101 of the fifth embodiment, namely a shift lens supporting part 231, a shift lens driving section 232, hall elements 233A-233C and a magnet 234.

The shift lens driving section 232 drives the shift lens supporting part 231 in the direction of the arrow a in FIG. 16. When the shift lens supporting part 231 is driven in the direction of the arrow a in FIG. 16, the left cam pin 227 and the right cam pin 228 connected with the left supporting part 225 and the right supporting part 226 are moved in the directions of the arrows b and c in FIG. 16 along the left cam groove 229 and the right cam groove 230. Therefore, the left shift lens 223 and the right shift lens 224 are moved in the directions of the arrows b and c in FIG. 16.

Note that the positions of the left shift lens 223 and the right shift lens 224 are detected in accordance with positional relation of the hall elements 233A-233C and the magnet 234. In FIG. 16, the positions of the left shift lens 223 and the right shift lens 224 indicated by solid lines are referred to as initial positions, and the positions indicated by dashed lines above and below the initial position are referred to as limit position of the left shift lens 223 and the right shift lens 224.

In this manner, by moving the left shift lens 223 and the right shift lens 224, in the first eye-fatigue relief mode and the second eye-fatigue relief mode, a position of an intermediate image observed from the side of the left ocular lens 207 and the right ocular lens 208 by an observer can be moved in an optical axis direction and a convergent direction of eyes of the observer.

In addition, the binoculars 201 include, as shown in FIG. 16, a controlling section 235 in the neighborhood of the hall elements 233A-233C. A controlling block diagram and explanation thereof are omitted because various controls by the controlling section 235 are the same as those in the fifth embodiment.

In the binoculars 201 having the constructions explained above, when the power button not shown is turned on, the controlling section 235 detects it as with the binoculars 101 of the fifth embodiment, and, after setting a certain mode, when a start button not shown is pressed, controls each section as in the following manner according to the set mode.

(1) Binocular Mode

When the binocular mode is set, the controlling section 235 moves firstly the left shift lens 223 and the right shift lens 224 to the initial position. Then, the left reflecting mirror 221 and the right reflecting mirror 222 are moved off, as explained in FIG. 17B, from the optical axis of the left ocular lens 207 and the right ocular lens 208, and the left objective lens 209 and the right objective lens 210 are positioned on the optical axis of the left ocular lens 207 and the right ocular lens 208. By positioning like this, the light fluxes are guided between the left objective lens 209 and right objective lens 210 and the left ocular lens 207 and right ocular lens 208, and the observer can observe a remote object from the side of the left ocular lens 207 and the right ocular lens 208.

(2) First Eye-fatigue Relief Mode

When the first eye-fatigue relief mode is set, the controlling section 235 moves firstly the left shift lens 223 and the right shift lens 224 to the initial position. And the left reflecting mirror 221 and the right reflecting mirror 222 are moved off, as explained in FIG. 17B, from the optical axis of the left ocular lens 207 and the right ocular lens 208, and the left objective lens 209 and the right objective lens 210 are positioned on the optical axis of the left ocular lens 207 and the right ocular lens 208. By positioning like this, the light fluxes are guided between the left objective lens 209 and right objective lens 210 and the left ocular lens 207 and right ocular lens 208.

And the controlling section 235 moves the left shift lens 223 and the right shift lens 224 reciprocally to the both limit positions that sandwich the initial position via the shift lens driving section 232. By moving the left shift lens 223 and the right shift lens 224 like this, a position of an intermediate image observed by an observer from the side of the left ocular lens 207 and the right ocular lens 208 is changed in an optical axis direction and a convergent direction of eyes of the observer. Accordingly, motion of the cyclotome of the eyes of the observer can be promoted.

Particularly, in the first eye-fatigue relief mode, because the light fluxes are guided between the left objective lens 209 and right objective lens 210 and the left ocular lens 207 and right ocular lens 208, the eye-fatigue relief operation can be done by using an observation image by the binoculars 201. Therefore, the observer observes a favorite appearance from the side of the left ocular lens 207 and the right ocular lens 208 of the binoculars 201, and relieves eye fatigue by using that observation image.

(3) Second Eye-fatigue Relief Mode

When the second eye-fatigue relief mode is set, the controlling section 235 moves firstly the left shift lens 223 and the right shift lens 224 to the initial position. Then, the left reflecting mirror 221 and the right reflecting mirror 222 are moved, as explained in FIG. 17C, onto the optical axis of the left ocular lens 207 and the right ocular lens 208, and the left display section 217 and the right display section 218 are positioned on the optical axis of the left ocular lens 207 and the right ocular lens 208. By positioning like this, the light fluxes are guided between the left display section 217 and right display section 218 and the left ocular lens 207 and right ocular lens 208.

Then, the controlling section 235 displays on the left display section 217 and the right display section 218 an image for relieving the eye fatigue as that of the fifth embodiment.

Then, the controlling section 235 moves the left shift lens 223 and the right shift lens 224 reciprocally to the both limit positions that sandwich the initial position via the shift lens driving section 232. By moving the left shift lens 223 and the right shift lens 224 like this, a position of an intermediate image observed by an observer from the side of the left ocular lens 207 and the right ocular lens 208 is changed in an optical axis direction and a convergent direction of eyes of the observer. Accordingly, motion of the cyclotome of the eyes of the observer can be promoted.

Particularly, in the second eye-fatigue relief mode, since the light fluxes are guided between the left display section 217 and right display section 218 and the left ocular lens 207 and right ocular lens 208, the eye-fatigue relief operation can be performed by using an image for relieving the eye fatigue. Therefore, by using the image dedicated to the eye fatigue relief and doing the eye-fatigue relief operation from the side of the left ocular lens 207 and the right ocular lens 208 of the binoculars 201, it is expected that the effects of relieving eye fatigue be increased.

As explained above, according to the eighth embodiment, the binoculars are provided with the ocular lens, the objective lens and the display section. A light flux is guided between the objective lens and the ocular lens or between the display section and the ocular lens, and also the position of the intermediate image observed by the observer is changed in the optical axis direction and the convergent direction of eyes of the observer. Accordingly, during use of the observation device (binoculars), the observer can be relieved from the eye fatigue with ease. Particularly, according to the eighth embodiment, the observation device (binoculars) can use a general structure provided therein to perform the eye fatigue relief operation, so that the size thereof can be made almost the same as that of a general observation device (binoculars), and it achieves the eye fatigue relief with ease.

According to the eighth embodiment, in response to the operation of the observer, one mode is set and achieved along any one of the first mode where the light flux is guided between the objective lens and the ocular lens, the second mode where the position of the intermediate image is changed in the optical axis direction and the convergent direction of eyes of the observer, while guiding the light flux between the objective lens and the ocular lens, and the third mode where the position of the intermediate image is changed in the optical axis direction and the convergent direction of eyes of the observer, while guiding the light flux between the display section and the ocular lens. Thereby, the device can be used as a general observation device (binoculars) for observing a remote object in the first mode, and as a device for relieving eye fatigue in the second mode and the third mode. Particularly, in the second mode, the eye-fatigue relief operation can be done by using the image observed by the binoculars 201. Therefore, the observer observes a favorite appearance from the sides of the left ocular lens 207 and the right ocular lens 208 of the binoculars 201, and relieves eye fatigue by using that observed image. In the third mode, it is expectable to increase the eye fatigue relief effect since the eye-fatigue relief operation is conducted by using the image dedicated to the eye fatigue relief.

Although the eighth embodiment describes the example where the position of the intermediate image observed by the observer is changed in the optical-axis direction and the convergent direction of the eyes of the observer, it may be changed only in the optical axis direction, or only in the convergent direction.

Further, although the eighth embodiment describes the example where the position of the intermediate image observed by the observer is changed in the optical axis direction and the convergent direction of the eyes of the observer by moving the left shift lens 223 and the right shift lens 224, it may be changed only in the optical axis direction by moving the left shift lens 223 and the right shift lens 224, or may be changed only in the convergent direction by moving the left display section 217 and the right display section 218. In this case, it is preferable to synchronize the movement of the left shift lens 223 and the right shift lens 224 with the movement of the left display section 217 and the right display section 218 in the convergent direction. In this manner, due to the changing in the optical axis direction by the movement of the left shift lens 223 and the right shift lens 224 and the changing in the convergent direction by the movement of the left display section 217 and the right display section 218, it is possible to simplify the construction of the position-changing section 240.

In addition, it may be employed that the position of the intermediate image observed by the observer is changed in the optical axis direction and the convergent direction of eyes of the observer by moving the left shift lens 223 and the right shift lens 224, and further a quantity of change in the convergent direction is increased by moving the left display section 217 and the right display section 218.

Further, the eighth embodiment describes the example where the left display section 217 and the right display section 218 are the displays such as a small-sized liquid crystal display, however, they may be replaced by a holder installed with a slide film and a back light in the same manner as explained with reference to FIG. 13 in the fifth embodiment. Such a construction can save the power, and the observer can conducts the eye-fatigue relief operation by using a favorite slide film.

Moreover, the eighth embodiment describes the example where the total internal reflection mirror is used as the left reflecting mirror 221 and the right reflecting mirror 222. However, a half mirror and a shutter may be provided as explained in the fifth embodiment, and an EL (Electric luminance) or a transmission type display device such as a transmission type liquid crystal may be provided as the left display section 217 and the right display section 218, and it may be combined with the shutters.

In addition, although the eighth embodiment describes the binoculars 201, the present invention may be applied to a telescope that has one ocular lens and one objective lens. With the telescope, an observer observes an object with one eye, so that a position of an intermediate image observed by the observer is changed not in the convergent direction but only in the optical axis direction.

In addition, the eighth embodiment describes the example where the two eye-fatigue relief modes, the first and second eye-fatigue relief modes are prepared, however, provision of only one of them may be possible. For example, when only the first eye-fatigue relief mode is employed, the left display section 217, the right display section 218, the left reflecting mirror 221 and the right reflecting mirror 222 are not necessary.

Ninth Embodiment

In the following, the ninth embodiment according to the present invention is explained by referring to the drawing. In the ninth embodiment, only the matters different from the eighth embodiment are explained, and explanation is omitted with respect to the same matters as in the eighth embodiment The Binoculars 250 according to the ninth embodiment have the first eye-fatigue relief mode and the second eye-fatigue relief mode that are the same as in the eighth embodiment, changes a position of an intermediate image observed by an observer only in the optical axis direction of the eyes of the observer.

Figure 18:
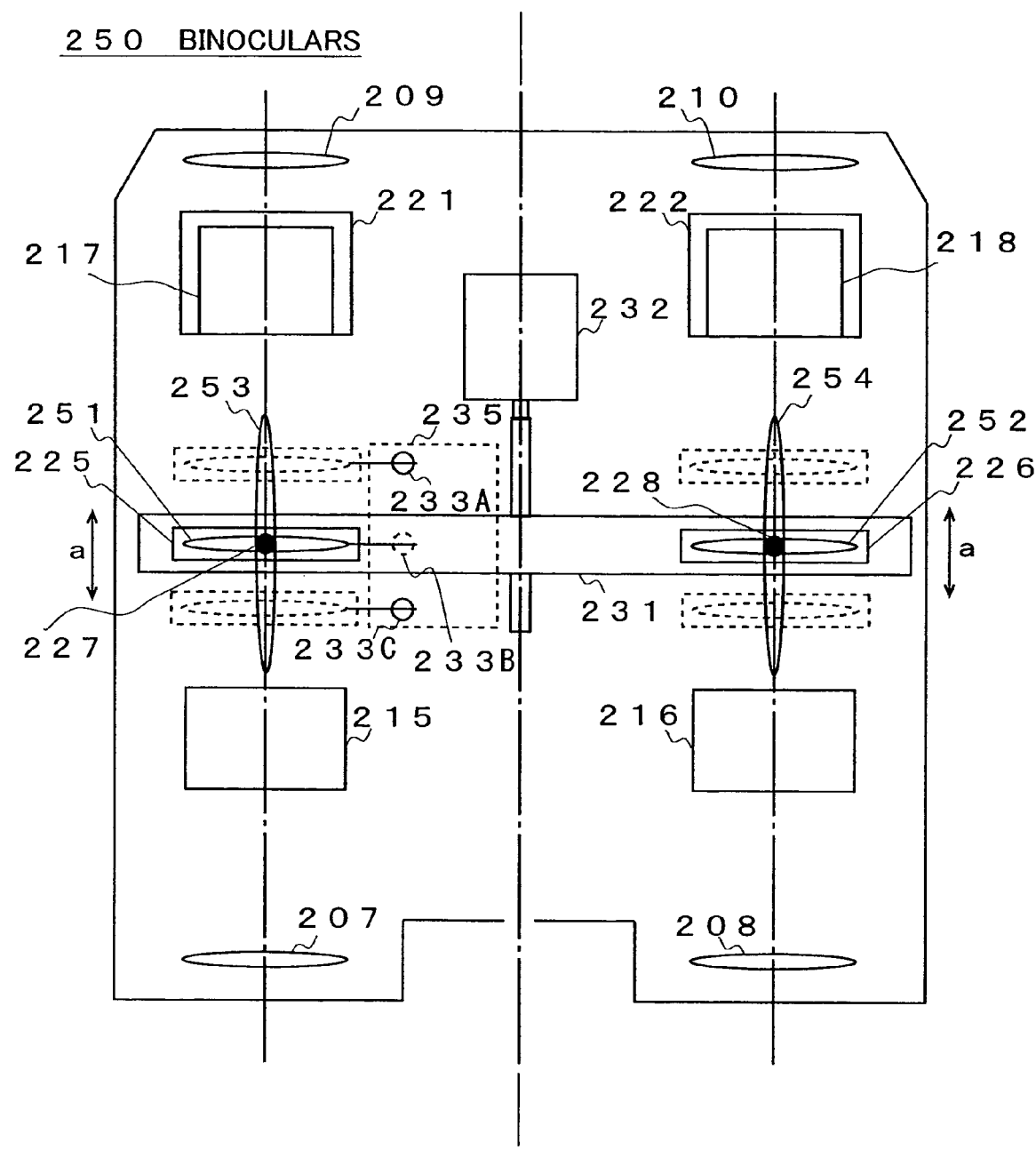
FIG. 18 is a view showing an internal construction of binoculars 250 according to a ninth embodiment.

FIG. 18 is an internal construction view showing the binoculars 250 from the left side. The members similar to those of the binoculars 201 of the eighth embodiment are given the same symbols thereof. As shown in FIG. 18, in the binoculars 250, there are omitted the left focus lens 211, the right focus lens 212, the focus lens moving section 213 and the detecting section 214 of the binoculars 201 according to the eighth embodiment, and the binoculars include a left dual-purpose lens 251 and a right dual-purpose lens 252 instead of the left shift lens 223 and the right shift lens 224. In addition, the binoculars 250 include a left cam groove 253 and a right cam groove 254 instead of the left cam groove 229 and the right cam groove 230 of the binoculars 201 according to the eighth embodiment. The other constructions are the same as those in the binoculars 201 according to the eighth embodiment.

The left cam groove 253 and the right cam groove 254 are different from the left cam groove 229 and the right cam groove 230 of the binoculars 201 according to the eighth embodiment in that they are positioned along light paths connecting the left ocular lens 207 and right ocular lens 208 and the left objective lens 209 and right objective lens 210 (the cam grooves being parallel to the light paths). Therefore, the left dual-purpose lens 251 and the right dual-purpose lens 252 move in the directions of the optical axes of the both dual-purpose lenses (in the direction of the arrow a in FIG. 18).

In addition, the left dual-purpose lens 251 and the right dual-purpose lens 252 are also used for focal adjustment in the binocular mode. Namely, by moving the left dual-purpose lens 251 and the right dual-purpose lens 252, the focus of the binoculars 250 is slid (focal adjustment), and the position of intermediate image observed by the observer from the left ocular lens 207 and the right ocular lens 208 can be changed in the first eye-fatigue relief mode and the second eye-fatigue relief mode. When changing the position of the intermediate image, the left dual-purpose lens 251 and the right dual-purpose lens 252 are moved in a wider range than when conducting the focal adjustment. The respective the movement ranges may be overlapped or separated.

Further, driving the left reflecting mirror 221 and the right reflecting mirror 222 in the same construction as that of the binoculars 201 according to the eighth embodiment can switch the light fluxes to guide from between the left objective lens 209 and right objective lens 210 and between the left dual-purpose lens 251 and right dual-purpose lens 252, to between the left display section 217 and right display section 218 and between the left du al-purpose lens 251 and right dual-purpose lens 252.

The binoculars 250 having the construction explained above conduct each operation in accordance with the set mode as with the binoculars 201 of the eighth embodiment.

As explained above, according to the ninth embodiment, the binoculars 250 is provided with the lens on the light path connecting the ocular lens and the objective lens and movable along the light path, and it makes the focal adjustment of the observation device (binoculars) and changes the position of the intermediate image observed by an observer from the ocular lens side in the optical axis direction of eyes of the observer by moving the position of the lens. Therefore, the lens has a dual function of the shift lens that change the position of the intermediate image observed by an observer from the ocular lens side and of the focus lens that makes the focal adjustment of the binoculars 250, so that it is possible to realize a simplified construction in addition to the same effects as of the binoculars 201 according to the eighth embodiment.

The ninth embodiment describes the example where the left dual-purpose lens 251 and the right dual-purpose lens 252 have the dual function of the shift lens and the focus lens, however, they may further have a dual function of the left ocular lens 207 and the right ocular lens 208.

The ninth embodiment describes the binoculars 250, however, it may be applied to a telescope that has one ocular lens and one objective lens.

Moreover, the binoculars 250 according to the ninth embodiment may be provided with a memory button not shown and a memory section not shown for storing the positions of the left dual-purpose lens 251 and the right dual-purpose lens 252 that are detected by the hall elements 233A-233C, to make the following operation.

In the binocular mode, when an observer operates the memory button not shown for focal adjustment, the controlling section 235 detects the focus adjusted positions of the dual-purpose lens 251 and the right dual-purpose lens 252 through the hall elements 233A-233C, and then stores them in the memory section not shown.

On the other hand, in the first eye-fatigue relief mode and the second eye-fatigue relief mode, when an observer operates the memory button not shown for focal adjustment for the eye-fatigue relief mode, the controlling section 235 detects the positions of the dual-purpose lens 251 and the right dual-purpose lens 252 through the hall elements 233A-233C, and then stores them in the memory section not shown.

Then, in the case where the observer uses the binoculars 250 at the second time or later, when the mode and the menu are set and the start button not shown is pressed, the controlling section 235 firstly judges as to whether or not the positions of the left dual-purpose lens 251 and the right dual-purpose lens 252 at the focal adjustment in each mode is stored in the memory section not shown. Then if the positions of the left dual-purpose lens 251 and the right dual-purpose lens 252 are stored, the stored positions are read out from the memory section not shown, and the left dual-purpose lens 251 and the right dual-purpose lens 252 are moved to the positions. Namely, the observer has only to conduct once the focal adjustment in the binocular mode and the eye-fatigue relief mode and store the positions of the left dual-purpose lens 251 and the right dual-purpose lens 252 in the binoculars 250. The observer can omit the focal adjustment for later use by using the stored information.

It is preferable to store the positions of the left dual-purpose lens 251 and the right dual-purpose lens 252 along with date and time and identification information of the user. In the case where plural pieces of data have been stored, it is preferable that data to read are selectable via the mode button and the like. Further, the judgment as to whether or not the positions of the left dual-purpose lens 251 and the right dual-purpose lens 252 at the focal adjustment are stored may not be automatically made, but it may be made only upon receiving an instruction from the observer.

In the eye-fatigue relief mode, since the positions of the left dual-purpose lens 251 and the right dual-purpose lens 252 are moved largely, the focal points are largely changed in the binocular mode. From that reason, when a focal adjustment is conducted after switching from the eye-fatigue relief mode to the binocular mode, it is necessary to move the positions of the left dual-purpose lens 251 and the right dual-purpose lens 252 largely, which makes it conceivable that its operation becomes complicated. However, as explained above, when the positions of the dual-purpose lenses at the focal adjustment with the use of the binoculars and at the eye-fatigue relief operation are stored, and the instruction to read the stored positions of the dual-purpose lenses is received, the stored positions of the dual-purpose lenses are read out from the memory section, and then the dual-purpose lenses are moved to the read-out positions, whereby it is not necessary to conduct complicated operation, allowing improvement in operational performance.

Tenth Embodiment

In the following, a tenth embodiment according to the present invention is explained by referring to the drawings.

Binoculars 260 according to the tenth embodiment have the binocular mode and the eye-fatigue relief mode for relieving the eye fatigue. The eye-fatigue relief mode is a mode where the eye-fatigue relief operation is conducted by using an image for relieving the eye fatigue.

Figure 19:
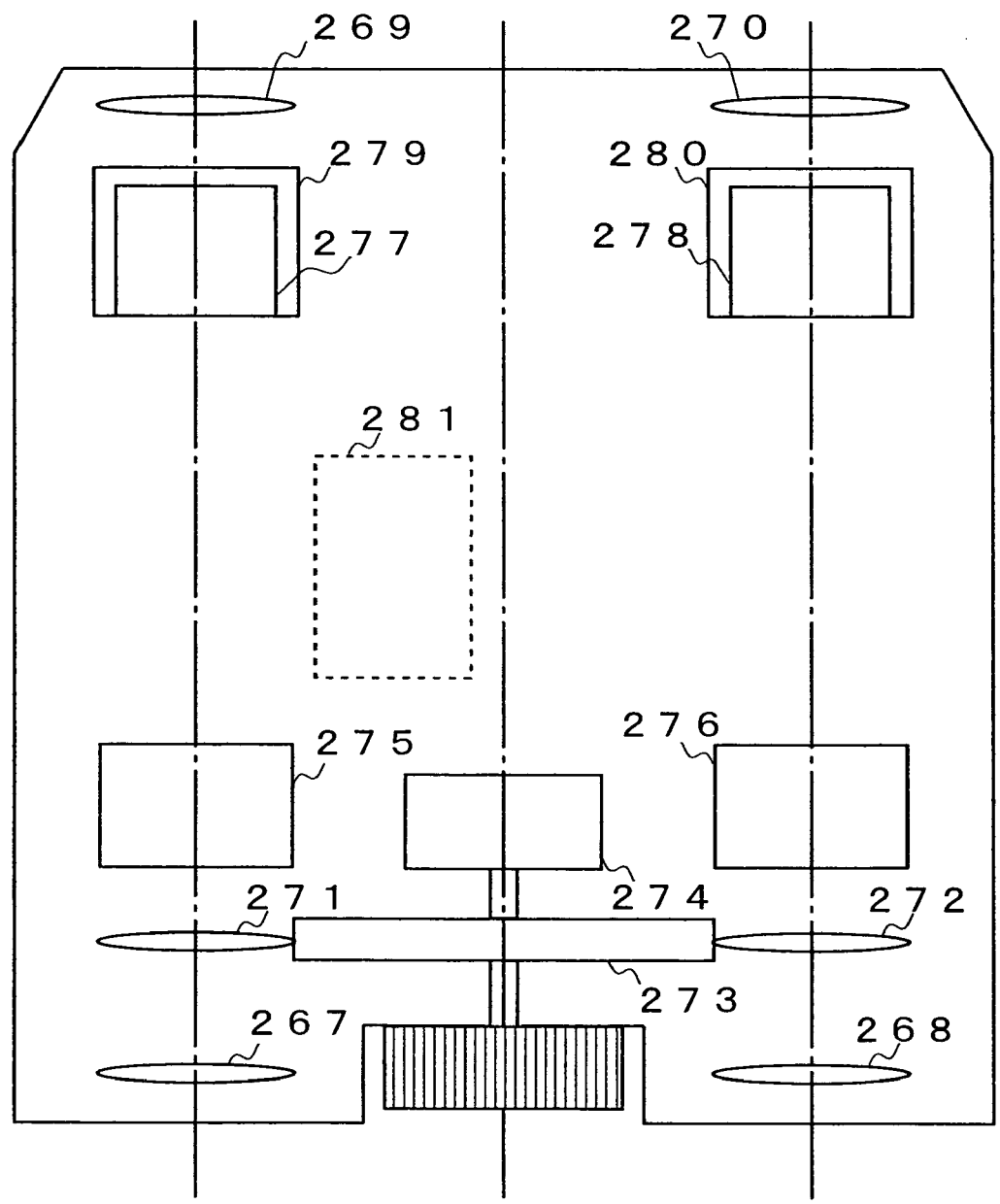
FIG. 19 is a view showing an internal construction of binoculars 260 according to a tenth embodiment.

The binoculars 260 include, as shown in the internal construction view of FIG. 19, a left ocular lens 267, a right ocular lens 268, a left objective lens 269, a right objective lens 270, a left focus lens 271 and a right focus lens 272 relating to focus slide, a focus lens moving section 273 which moves the left focus lens 271 and the right focus lens 272, a detecting section 274 to detecting a movement distance of the focus lens, a left erecting prism 275 and a right erecting prism 276 to convert an inverted image to an erected image.

Further, the binoculars 260 include, in the same construction as that of the binoculars 201 according to the eighth embodiment, a left display section 277 and a right display section 278, an image-forming lens not shown for the left display section, an image-forming lens for the right display section not shown, a left reflecting mirror 279 and a right reflecting mirror 280. The left display section 277 and the right display section 278 are provided on the light paths branched from the light paths connecting the left ocular lens 267 and right ocular lens 268 with the left objective lens 269 and right objective lens 270.

Further, the left reflecting mirror 279 and the right reflecting mirror 280 are provided on the light paths connecting the left ocular lens 267 and right ocular lens 268 with the left objective lens 269 and right objective lens 270 and also on the light paths connecting the left ocular lens 267 and right ocular lens 268 with the left display section 277 and right display section 278, and they are optical elements which switches the light fluxes to guide from between the left objective lens 269 and right objective lens 270 and between the left ocular lens 267 and right ocular lens 268 to between the left display section 277 and right display section 278 and between the left ocular lens 267 and right ocular lens 268. The left reflecting mirror 279 and the right reflecting mirror 280 operate the same as the left reflecting mirror 221 and the right reflecting mirror 222 of the binoculars 201 according to the eighth embodiment, therefore, the description thereof is omitted.

Namely, the light fluxes are guided between the left objective lens 269 and right objective lens 270 and between the left ocular lens 267 and right ocular lens 268 or between the left display section 277 and right display section 278 and between the left ocular lens 267 and right ocular lens 268, by moving the left reflecting mirror 279 and the right reflecting mirror 280. Accordingly, the respective modes are easily switchable only by moving the left reflecting mirror 279 and the right reflecting mirror 280.

In addition, the binoculars 260 according to the tenth embodiment include a controlling section 281. The controlling section 281 detects the conditions of the detecting section 274 and also controls the left display section 277 and the right display section 278, the left reflecting mirror 279, the right reflecting mirror 280 and the mirror driving section not shown.

Different from the binoculars 201 according to the eighth embodiment, the binoculars 260 according to the tenth embodiment do not have a mechanism of movement for changing the position of the intermediate image observed by the observer. Instead, according to the tenth embodiment, the position of the eye mark included in the image for relieving the eye fatigue that is displayed on the left display section 277 and the right display section 278 in the same manner as that of the binoculars 160 according to the seventh embodiment.

In the binoculars 260 having the constructions explained above, when a power button not shown is turned on, the controlling section 281 detects it, and a certain mode is set by a mode button not shown, and the controlling section 281 watches until a start button not shown is pressed. Note that the mode set here is any one of the aforementioned binocular mode and eye-fatigue relief mode.

When the start button not shown is pressed, the controlling section 281 controls each section as in the following manner according to the set mode.

(1) Binocular Mode

In the binocular mode, the controlling section 281, as in the eighth embodiment, moves off the left reflecting mirror 279 and the right reflecting mirror 280, as explained in FIG. 17B, from the optical axis of the left ocular lens 267 and the right ocular lens 268, and positions the left objective lens 269 and the right objective lens 270 on the optical axis of the left ocular lens 267 and the right ocular lens 268. By positioning like this, the light fluxes are guided between the left objective lens 269 and right objective lens 270 and the left ocular lens 267 and right ocular lens 268, and the observer can observe a remote object from the side of the left ocular lens 267 and the right ocular lens 268.

(2) Eye-fatigue Relief Mode

In the eye-fatigue relief mode, the controlling section 281 moves the left reflecting mirror 279 and the right reflecting mirror 280, as explained in FIG. 17C, onto the optical axes passing through the left ocular lens 267 and the right ocular lens 268 respectively, and positions the left display section 277 and the right display section 278 on the optical axes of the left ocular lens 267 and the right ocular lens 268 respectively. By positioning like this, the light fluxes are guided between the left display section 277 and right display section 278 and the left ocular lens 267 and right ocular lens 268.

Then the controlling section 281 displays images for relieving eye fatigue on the left display section 277 and the right display section 278 in the same manner as that of the binoculars 160 according to the seventh embodiment. Next, the controlling section 281 changes the position of the eye mark in the image for relieving the eye fatigue to the convergent direction of the eyes of the observer. By changing the position of the eye mark like this, motion of the cyclotome of the eyes of the observer can be promoted.

As explained above, according to the tenth embodiment, the binoculars are provided with the ocular lens and the objective lens and the display section that displays the image including the picture which is specific in at least one of shape, brightness and color. A light flux is guided between the objective lens and the ocular lens or between the display section and the ocular lens, and also at least one of the position and the features of the picture in the image displayed on the display section is changed. Accordingly, during use of the observation device (binoculars), the observer can be relieved from the eye fatigue with ease. Particularly, according to the tenth embodiment, the observation device (binoculars) can use a general structure provided therein to perform the eye fatigue relief, so that the size thereof is made almost the same as that of a general observation device (binoculars), and the eye fatigue can be relieved with ease.

The tenth embodiment describes the example where the position of the eye mark is changed in the image displayed on the left display section 277 and the right display section 278 to promote the eye fatigue relief of the observer by moving his/her eyes in the convergent direction, however, the size of the eye mark may be changed. Changing the size of the eye mark makes it possible to obtain the same effects as changing the intermediate image observed by the observer in the optical axis direction (refer to the eighth embodiment). Both of the position and the size of the eye mark may be changed, and further the shape, brightness and the like may be changed.

In addition, the tenth embodiment describes the binoculars 260, however, the present invention may be applied to a telescope that has one ocular lens and one objective lens.

The eighth embodiment to the tenth embodiment describes the examples where the image for eye-fatigue relief operation is recorded in the controlling section, however, it may be possible that the observer may select one of several images prepared in advance.

The techniques for the binoculars explained above in the first embodiment to the tenth embodiment may be combined or replaced arbitrarily In accordance with the constructions of the observation device.

The invention is not limited to the above embodiments and various modifications may be made without departing from the spirit and scope of the invention. Any improvement may be made in part or all of the components.

What is claimed is:

1. An observation device having an ocular lens and an objective lens and adapted to observe through said ocular lens an intermediate image of an object formed by said objective lens, said observation device comprising:
    a display section that is provided either on a light path connecting said ocular lens and said objective lens or on a light path branched off from the light path and displays an image; and
    a light path switching section that is provided on the light path connecting said ocular lens and said objective lens and switches light to be guided from said objective lens to said ocular lens and the image displayed on said display section to be guided to said objective lens.

2. Binoculars having two observation devices according to claim 1 in a right portion and a left portion, respectively.

3. The binoculars according to claim 2, wherein a distance between the ocular lenses of the observation devices is adjustable.

4. The observation device according to claim 1, further comprising a display lens between said display section and one of said light path switching section and said light path dividing section.

5. The observation device according to claim 1, wherein
    at least part of said objective lens is movable in a direction along the light path connecting said ocular lens and said objective lens.

6. The observation device according to claim 1, further comprising:
    a position-changing section that is provided on a light path connecting said objective lens and said display section and changes a position of the intermediate image observed by an observer from an objective lens side in at least one of an optical axis direction and a convergent direction of eyes of the observer; and
    a controlling section that controls said display section, said light path switching section, and said position-changing section.

7. The observation device according to claim 6, further comprising a dual-purpose lens that is provided on the light path connecting said ocular lens and said objective lens and is movable in a direction along the light path, wherein:
    said position-changing section includes said dual-purpose lens; and
    said controlling section moves a position of said dual-purpose lens to thereby make focal adjustment of said observation device and change a position of the intermediate image observed by said observer from the objective lens side in the optical axis direction of the eyes of the observer.

8. The observation device according to claim 7, comprising:
    a detecting section that detects a position of said dual-purpose lens;
    a memory section that stores the position of said dual-purpose lens detected by said detecting section when the focal adjustment is made and the position of said intermediate image is changed; and
    a receiving section that receives an instruction to read the position of said dual-purpose lens stored in said memory section, wherein
    when said receiving section receives the instruction, said controlling section reads the position of said dual-purpose lens from said memory section and moves said dual-purpose lens to the read position.

9. The observation device according to claim 1, further comprising an eye pad member near said objective lens.

10. The observation device according to claim 1, wherein at least part of said ocular lens is movable in a direction along the light path connecting said ocular lens and said objective lens.

11. An observation device having an ocular lens and an objective lens and adapted to observe through said ocular lens an intermediate image of an object formed by said objective lens, said observation device comprising:

a display section that is provided either on a light path connecting said ocular lens and said objective lens or on a light path branched off from said light path and displays an image; and a light path dividing section that is provided on the light path connecting said ocular lens and said objective lens, and guides light from said objective lens to said ocular lens and guides the image displayed on said display section to said objective lens.

12. Binoculars having two observation devices according to claim 11, in a right portion and a left portion, respectively.

13. The binoculars according to claim 12, wherein a distance between the ocular lenses of the observation devices is adjustable.

14. The observation device according to claim 11, further comprising:

a position-changing section that is provided on a light path connecting said objective lens and said display section and changes a position of the intermediate image observed by an observer from an objective lens side in at least one of an optical axis direction and a convergent direction of eyes of the observer; and a controlling section that controls said display section, said light path switching section, and said position-changing section.

15. The observation device according to claim 14, further comprising a dual-purpose lens that is provided on the light path connecting said ocular lens and said objective lens and is movable in a direction along the light path, wherein:

said position-changing section includes said dual-purpose lens; and said controlling section moves a position of said dual-purpose lens to thereby make focal adjustment of said observation device and change a position of the intermediate image observed by said observer from the objective lens side in the optical axis direction of the eyes of the observer.

16. The observation device according to claim 15, comprising:

a detecting section that detects a position of said dual-purpose lens;

a memory section that stores the position of said dual-purpose lens detected by said detecting section when the focal adjustment is made and the position of said intermediate image is changed; and a receiving section that receives an instruction to read the position of said dual-purpose lens stored in said memory section, wherein when said receiving section receives the instruction, said controlling section reads the position of said dual-purpose lens from said memory section and moves said dual-purpose lens to the read position.

* * * * *

UNITED STATES PATENT AND TRADEMARK OFFICE
CERTIFICATE OF CORRECTION

PATENT NO. : 7,961,387 B2
APPLICATION NO. : 10/594435
DATED : June 14, 2011
INVENTOR(S) : Haga et al.

It is certified that error appears in the above-identified patent and that said Letters Patent is hereby corrected as shown below:

On the Title Page:

In Item (75), the residence of the first inventor should read --Kodaira (JP)--.

Signed and Sealed this
Tenth Day of April, 2012

David J. Kappos
*Director of the United States Patent and Trademark Office*